United States Patent
Koide

(10) Patent No.: US 9,718,617 B2
(45) Date of Patent: Aug. 1, 2017

(54) ARTICLE TRANSFER DEVICE AND ARTICLE TRANSPORT FACILITY

(71) Applicant: Daifuku Co., Ltd., Osaka-shi (JP)

(72) Inventor: Hiroyuki Koide, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/353,094

(22) Filed: Nov. 16, 2016

(65) Prior Publication Data
US 2017/0137221 A1 May 18, 2017

(30) Foreign Application Priority Data

Nov. 18, 2015 (JP) .................................. 2015-226008

(51) Int. Cl.
| | | |
|---|---|---|
| *G06F 7/00* | (2006.01) | |
| *B65G 1/04* | (2006.01) | |
| *B65G 1/06* | (2006.01) | |
| *H02P 31/00* | (2006.01) | |

(52) U.S. Cl.
CPC ......... *B65G 1/0492* (2013.01); *B65G 1/0435* (2013.01); *B65G 1/06* (2013.01); *H02P 31/00* (2013.01); *B65G 2203/0266* (2013.01)

(58) Field of Classification Search
None
See application file for complete search history.

(56) References Cited

U.S. PATENT DOCUMENTS

| | | | | |
|---|---|---|---|---|
| 4,955,344 A | * | 9/1990 | Tatsumi | E02F 9/2025 123/352 |
| 2013/0073086 A1 | * | 3/2013 | Motoyoshi | G05B 15/00 700/258 |
| 2016/0201294 A1 | * | 7/2016 | Aoki | F16H 61/42 701/99 |

FOREIGN PATENT DOCUMENTS

JP 2004203546 A 7/2004

* cited by examiner

*Primary Examiner* — Yolanda Cumbess
(74) *Attorney, Agent, or Firm* — The Webb Law Firm

(57) ABSTRACT

When an external force applied condition that an external force that causes a decrease in a rotational speed of an electric motor is applied to the contact member moved by the electric motor is satisfied while the actuation controller is performing a first control for continuously performing a process of providing the electric motor with a command value that depends on an error between an actual rotational speed of the electric motor and a first target rotational speed so as to cause the actual rotational speed to approach the first target rotational speed, then the actuation controller, subsequent to the first control, performs a second control for providing the electric motor with a command value that allows the actual rotational speed of the motor to be equal to, and to fall below, the first target rotational speed at a time of the external force applied condition becoming satisfied.

15 Claims, 11 Drawing Sheets

ARTICLE TRANSFER DEVICE AND ARTICLE TRANSPORT FACILITY

CROSS-REFERENCE TO RELATED APPLICATION

This application claims priority to Japanese Patent Application No. 2015-226008 filed Nov. 18, 2015, the disclosure of which is hereby incorporated in its entirety by reference.

FIELD OF THE INVENTION

The present invention relates to an article transfer device configured to move an article along a transfer direction and an article transport facility having such an article transfer device.

BACKGROUND

JP Publication of Application No. 2004-203546 (Patent Document 1) describes an article transfer device for moving articles along a transfer direction. More specifically, the article transfer device described in Patent Document 1 includes a contact member that contacts an article and moves the article by moving along the transfer direction, an actuating mechanism which includes an electric motor for moving the contact member along the transfer direction, and an actuation controller which controls the action of the actuating mechanism. And the contact member which is located away from a stationary article is moved by the actuating mechanism and is caused to come into contact with the article. And the article is moved along the transfer direction by moving the contact member, with the contact member in contact with the article. In order to move the article quickly during this operation, it is necessary to increase the moving speed of the contact member.

However, the impact force on the article would be large if the contact member comes into contact with the articles at a large speed, which may cause problems, such as the article being deformed and/or noise being generated. In the invention described in Patent Document 1, a speed control of the electric motor is performed in which the contact member is moved at a low speed at first, and the moving speed of the contact member is increased at the moment of, or after, the contact member coming into contact with the article. Thus, an attempt has been made to quickly transfer articles while reducing impact force applied on the articles. Note that such a speed control is commonly performed through a feedback control in which command values are provided to the electric motor that depend on the error between the actual rotational speed of the electric motor and a target rotational speed and that would cause the actual rotational speed of the electric motor to approach the target rotational speed, for example.

SUMMARY OF THE INVENTION

When a feedback control is performed in which the command values are provided to the electric motor that depend on the error between the actual rotational speed of the electric motor and the target rotational speed, a phenomenon may happen where the contact member keeps repeating the process of coming into, and then moving out of, contact with the article, with the result that the article is not moved at a steady speed.

To describe this in more detail using an example, there is no change in the load on an electric motor, during the time period between the starting of the electric motor and the collision of the contact member with the article.

Subsequently, when the contact member collides with the article, the extra load due to the collision will be added to the contact member. This causes the actual rotational speed of the electric motor to decrease, which in turn causes the error between the target rotational speed and the actual rotational speed of the electric motor to increase. Furthermore, with the article transfer device described in Patent Document 1, the target rotational speed of the electric motor is increased at the moment of, or after, the contact member coming into contact with the article; thus, the error between the target rotational speed and the actual rotational speed of the electric motor becomes even greater. As a result, in response to the rapid increase in the error, command values are issued to the electric motor that would cause the electric motor (which has been slowed down by the collision between the contact member and the article) to accelerate very rapidly.

The contact member as well as the article is accelerated rapidly with the rapid increase in the rotational speed of the electric motor. As a result, the actual rotational speed of the electric motor approaches the target rotational speed, which reduces the difference between the two speeds. Thus, in response to the decreased error, new command values which would cause the electric motor to decelerate are then given to the electric motor.

When the electric motor decelerates, the moving speed of the contact member which is operatively connected with the electric motor also decreases. However, because of its inertia, the moving speed of the article is still the same as the speed at the time the electric motor accelerated rapidly. Therefore, the moving speed of the article ends up being greater than the moving speed of the contact member. As a result, the contact member and the article are moved apart from each other, which reduces the load on the electric motor.

Subsequently, when the contact member collides with the article again, the extra load due to the collision is transmitted also to the electric motor, which causes the rotational speed of the electric motor to be reduced. And as described above, the phenomenon may happen where the contact member and the article become separated after the collision between them. In other words, repeated collision and separation between the contact member and the article would lead to a fluctuation in the actual rotational speed of the electric motor.

Thus, if a feedback control is performed in which command values are provided to the electric motor that depend on the error between the actual rotational speed of the electric motor and the target rotational speed and that would cause the actual rotational speed of the electric motor to approach the target rotational speed, this may result in a phenomenon where large changes or fluctuations in the actual rotational speed of the electric motor are repeated and thus collisions and separations between the contact member and the article are repeated, with the result that the article is not moved at a steady speed.

Thus, an article transfer device which can transfer an article at a steady moving speed, as well as an article transport facility having such an article transfer device, are desired.

The characteristic arrangement of an article transfer device configured to move an article along a transfer direction in light of the above is that it comprises:

a contact member configured to be moved along the transfer direction to contact an article and to move the article;

an actuating mechanism which includes an electric motor for moving the contact member along the transfer direction; and an actuation controller configured to control operation of the actuating mechanism;

wherein, when an external force applied condition that an external force that causes a decrease in a rotational speed of the electric motor is applied to the contact member moved by the electric motor is satisfied while the actuation controller is performing a first control for continuously performing a process of providing the electric motor with a command value that depends on an error between an actual rotational speed of the electric motor and a first target rotational speed so as to cause the actual rotational speed to approach the first target rotational speed, then the actuation controller, subsequent to the first control, performs a second control for providing the electric motor with a command value that allows the actual rotational speed to be equal to, and to fall below, the first target rotational speed at a time of the external force applied condition becoming satisfied.

With the arrangement describe above, when the rotational speed of the electric motor is decreased when the external force applied condition is satisfied while performing the first control, the actuation controller performs a second control for providing the electric motor with a command value that allows the actual rotational speed to be equal to, and to fall below, the first target rotational speed at a time of the external force applied condition becoming satisfied. In other words, even if the rotational speed of the electric motor is decreased as a result of the fact that the external force applied condition is satisfied, the electric motor would not receive any commands that would cause it to operate at speeds greater than the first target rotational speed at a time of the external force applied condition becoming satisfied, while the second control is performed after performing the first control. As a result, while the second control is performed, any large changes in the actual rotational speed of the electric motor would be suppressed. Therefore, the problem with the conventional system that large changes or fluctuations in the actual rotational speed of the electric motor are repeated and thus collisions and separations between the contact member and the article are repeated can be alleviated.

Therefore, an article transfer device can be provided in which an article can be transferred with the speed of the article kept steady.

DETAILED DESCRIPTION

<First Embodiment>

The article transfer device in accordance with the first embodiment is described with reference to the drawings.

Figure 1:
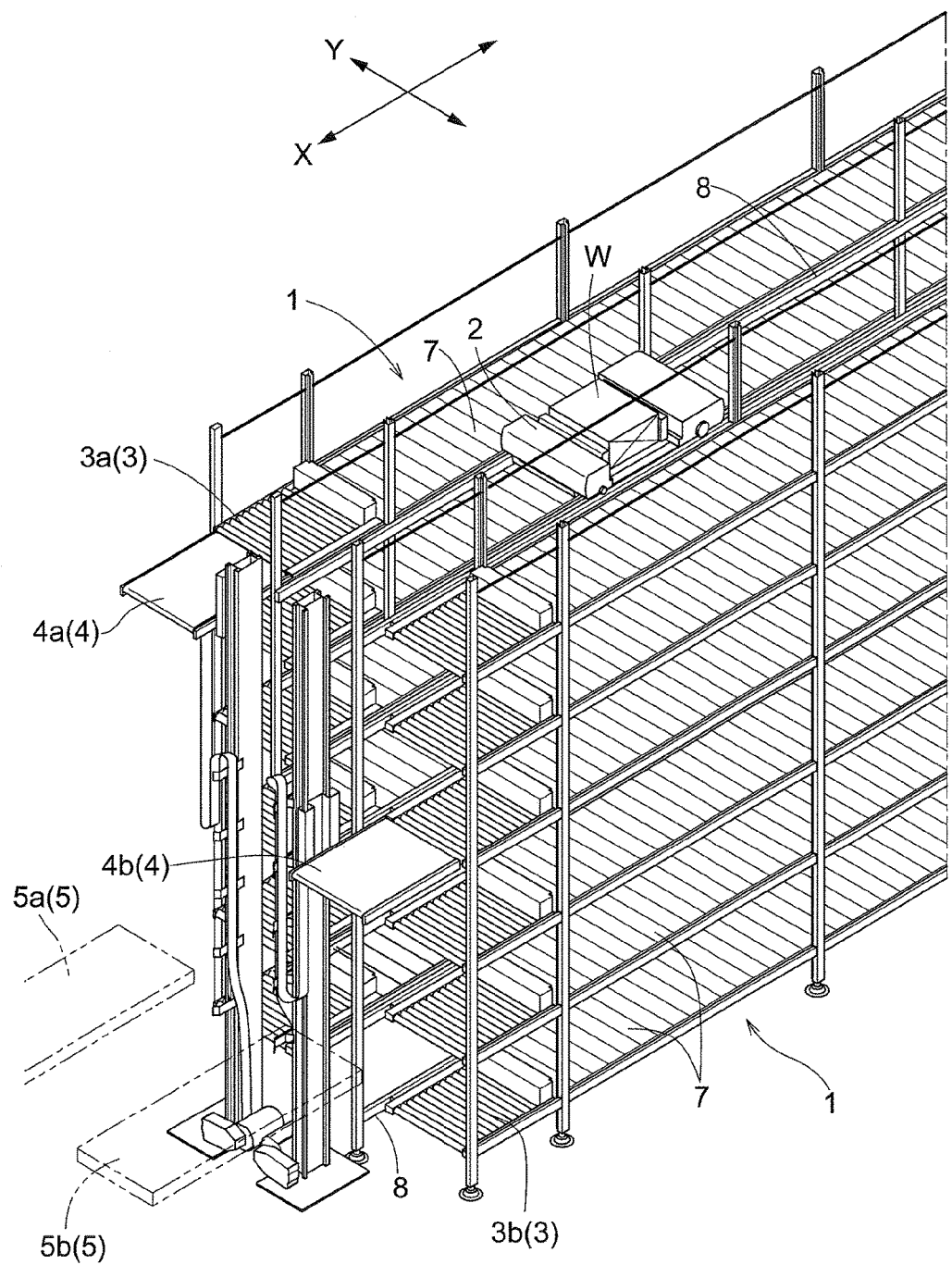
FIG. 1 is a perspective view of an article transport facility which incorporates an article transfer device.

FIG. 1 is a perspective view of an article transport facility which incorporates an article transfer device 2B. As shown in FIG. 1, the article transport facility has article support portions 1 each of which is configured to support articles, and article transports 2 each of which is capable of moving along its travel path. Each article transport 2 is configured to be capable of delivering articles W, one at a time, to either of the article support portions 1 and receiving articles W, one at a time, from either of the article support portions 1 by moving the article W along a transfer direction by means of its article transfer device 2B at predetermined or preset locations along the travel path.

As shown in FIG. 1, the article support portions 1 are used to store articles W. Travel rails 8 which define the travel path generally extends linearly along a direction indicated by X (X-direction, for short) between two end portions. Each article support portion 1 is located and generally extends linearly along the travel rails 8.

In the present embodiment, a pair of article support portions 1 are installed along the travel rails 8 such that they are spaced apart from each other along a direction indicated by Y (Y-direction, for short) with the travel rails 8 located therebetween. In each article support portion 1, a plurality of shelf boards 7 (six vertical levels in the present embodiment) on which articles W are placed are provided such that the shelf boards 7 are spaced apart from one another along a vertical direction. A plurality of pairs of travel rails 8 (to form six travel paths in the present embodiment) are installed such that the pairs are spaced apart from one another along the vertical direction and so that the number of the pairs correspond to the number of vertical levels of the shelf boards 7 in the article support portions 1. The travel rails 8 are supported by each of the pair of article support portions 1 of the corresponding level.

Note that a single article support portion 1 may be provided only on one side of the travel rails 8.

In the example shown in FIG. 1, the article transport facility is also provided with relay conveyors 3, and lifts 4 and carry-in-and-out conveyors 5.

The relay conveyors 3 are used to carry in articles W into, and carry out articles W from, the article support portions 1. The relay conveyors 3 include carry-in relay conveyors 3a which are used when carrying in articles W into the article support portions 1, and carry-out relay conveyors 3a which are used when carrying out articles W from the article support portions 1. A number of pairs (six pairs in the present example) of relay conveyors 3 (with each pair consisting of the carry-in relay conveyor 3a and the carry-out relay conveyor 3b) are installed such that the carry-in relay conveyor 3a and the carry-out relay conveyor 3b in each pair are spaced apart from each other along the Y-direction, such that the number of such pairs correspond to the number of vertical levels of the shelf boards 7 of the article support portions 1, and such that different pairs are space apart from each other along the vertical direction.

The lifts 4 include a carry-in lift 4a (lift used when carrying in an article W), and a carry-out lift 4b (lift used when carrying out an article W). The carry-in-and-out conveyors 5 include a carry-in conveyor 5a (conveyor used when carrying in an article W), and a carry-out conveyor 5b (conveyor used when carrying out an article W).

In the article transport facility so arranged, the articles W carried in from the carry-in conveyor 5a are transported and distributed by the carry-in lift 4a among the plurality of carry-in relay conveyors 3a. And an article W placed on a carry-in relay conveyor 3a is transported to a shelf board 7 provided to the same level by the article transport 2 provided to the same level.

An article W on a shelf board 7 is transported to the carry-out relay conveyor 3b provided to the same level by the article transport 2 provided to the same level as the shelf board 7. And an article W placed on any of the plurality of carry-out relay conveyors 3b is transported to the carry-out conveyor 5b by the carry-out lift 4b.

The article transport 2 is described next.

Figure 2:
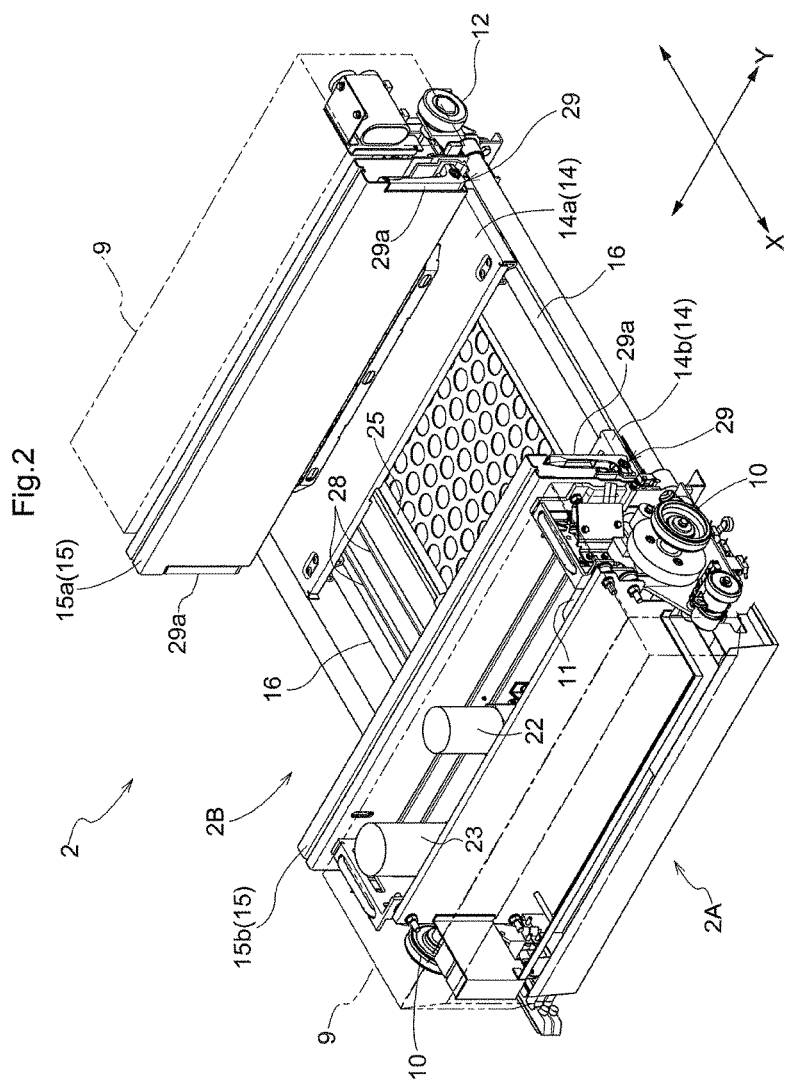
FIG. 2 is a perspective view of an article transport in which the article transfer device is mounted.
Figure 3:
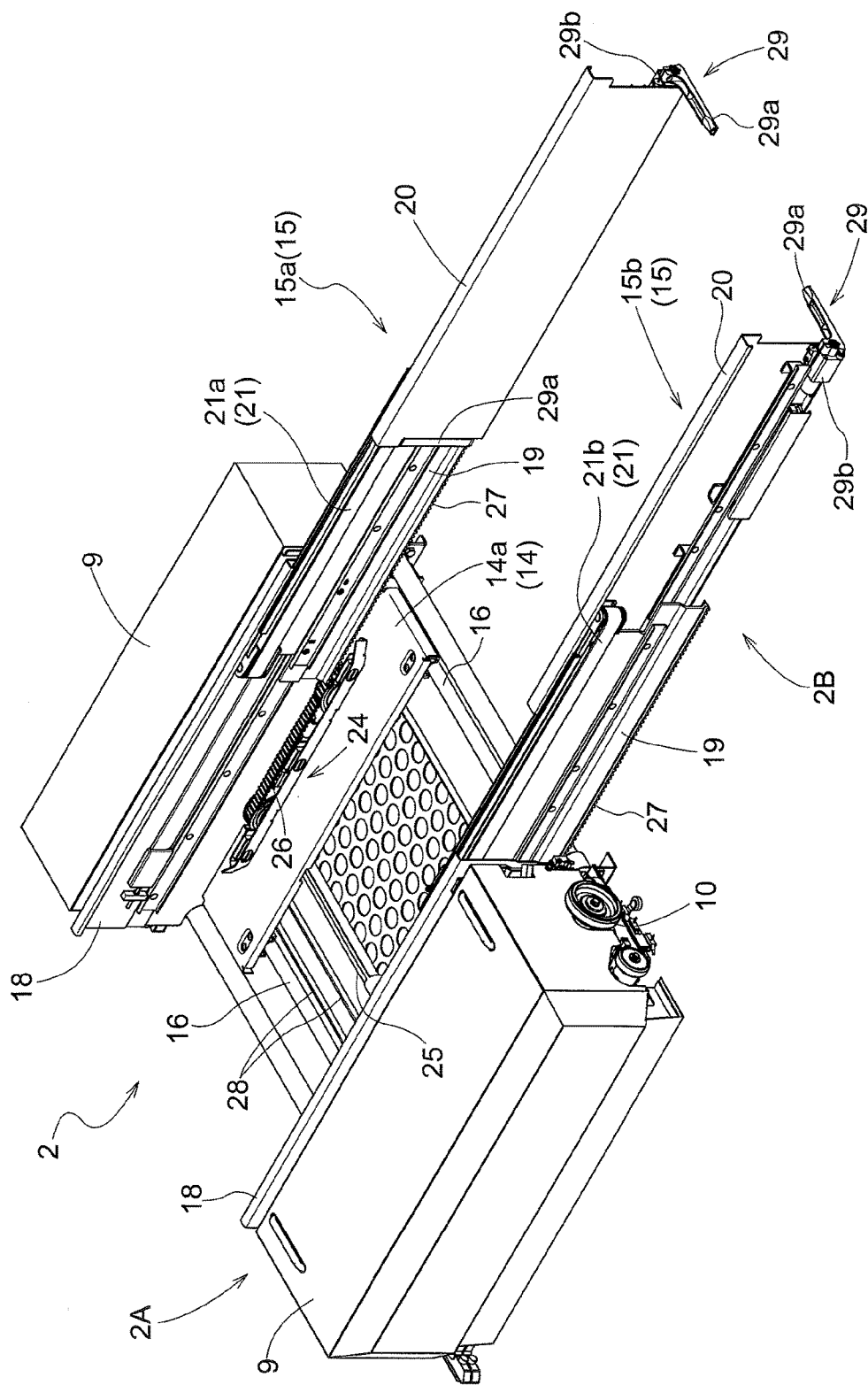
FIG. 3 is a perspective view of an article transport in which the article transfer device is mounted.
Figure 4:
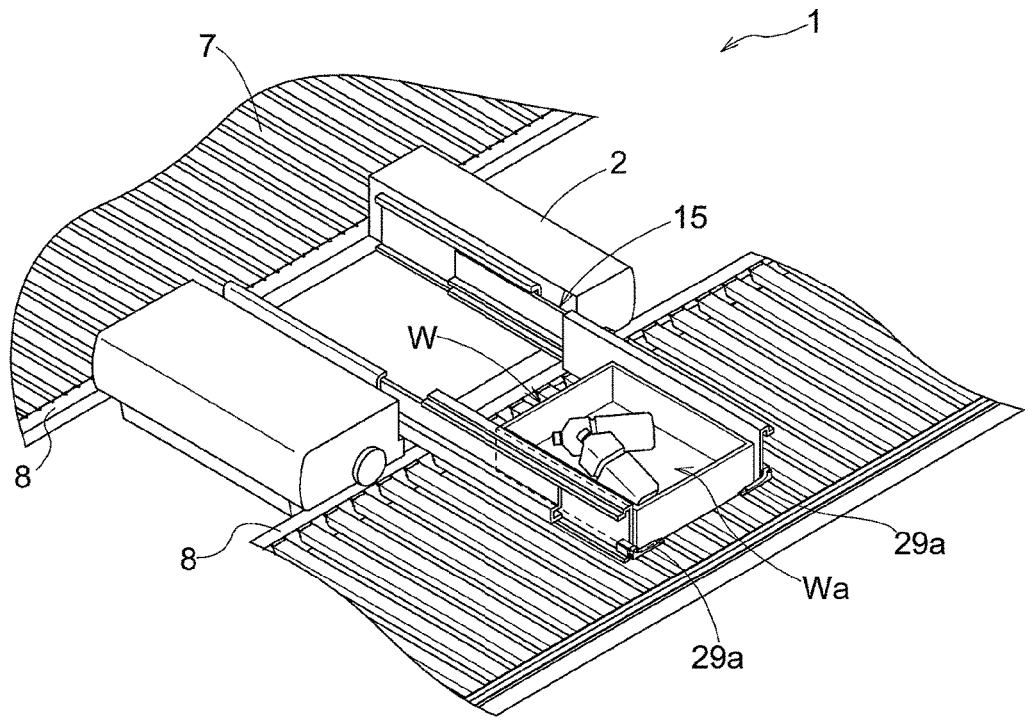
FIG. 4 is a perspective view showing how the article transport transfers an article.

FIGS. 2 and 3 are perspective views of the article transport 2 in which an article transfer device 2B is mounted and which can move along its travel path. In particular, FIG. 2 shows the article transport 2 with its cover 9 removed while FIG. 3 shows the article transport 2 with its cover 9 installed. And FIG. 4 is a perspective view showing how the article transport 2 transfers an article.

As shown in FIGS. 2 and 3, the article transport 2 has an article transfer device 2B configured to move an article W along the Y-direction (transfer direction) to transfer the article W. In other words, in the present embodiment, the direction (X-direction) along which the travel path (travel rails 8) of the article transport 2 extend and the transfer direction (Y-direction) along which articles W are transferred by the article transfer device 2B are perpendicular to each other in plan view.

The article transport 2 has a carriage main body 2A configured to travel along the travel direction (X-direction). And the article transfer device 2B is mounted on the carriage main body 2A. In other words, the article transport 2 can move back and forth on and along the travel rails 8.

The carriage main body 2A which is a part of the article transport 2 is configured to be capable of moving along the travel path. More specifically, the carriage main body 2A has a pair of drive wheels 10 which roll on the pair of travel rails 8 (see FIG. 1) installed in advance as a travel path, a drive motor 11 for drivingly rotate the pair of drive wheels 10, and a pair of freely rotatable wheels 12 which roll on the travel rails 8. The pair of drive wheel 10 are operatively connected to each other by means of a travel drive shaft (not shown). And the carriage main body 2A can travel back and forth along its travel path along the X-direction, as a result of the fact that the travel drive shaft and thus the pair of drive wheels 10 are driven and rotated by the actuating action of the drive motor 11.

In the present embodiment, each article W is generally rectangular in shape as seen from above, such as, a rectangular parallelepiped etc., for example. Note that the article transfer device 2B can transfer articles W of various types. For example, as shown in FIG. 4, the article W may be a container having an opening Wa that opens upward. FIG. 4 shows an example in which beverage bottles etc. are held in the container which is the article W. Alternatively, an article W may have a shape which does not have an opening Wa as shown in FIG. 4, i.e., may have a closed configuration. Alternatively, an article W may be a solid object as opposed to a hollow container described above. In addition, an article W may be a plurality of objects to be carried that are piled up on top of one another, or one or more objects placed on a pallet, that can be transported together as one object, or may be a plurality of objects that are placed next to one another along the transporting direction that can be transported together as one object. Furthermore, an article W may be a group of a plurality of objects which are piled up on top of one another and are placed next to one another along the transport direction.

The article transfer device 2B is supported by the carriage main body 2A. The article transfer device 2B has hooks 29a (each of which, is, or corresponds to, the "contact member") 29a which are configured to contact an article W to move the article W as the hooks 29a are moved along the transfer direction (Y-direction), an actuating mechanism which includes a projecting and retracting motor 22 (an electric motor used for the projecting and retracting operation, which corresponds to the "electric motor") for moving the hooks 29a along the transfer direction (Y-direction), and an actuation controller which controls the operation of the actuating mechanism. The actuation controller is realized by the controller C described below. The actuating mechanism is a device for moving the hooks 29a along the transfer direction (Y-direction). In the present embodiment, the actuating mechanism includes the projecting and retracting motor 22 mentioned above, a drive shaft 25 for projecting and retracting (projecting-and-retracting drive shaft) which is driven and rotated both in forward and reverse directions by the projecting and retracting motor 22, toothed belts 26 that are actuated with the rotation of the projecting-and-retracting drive shaft 25, slide devices 15 which are projected and retracted along the Y-direction with the rotation of the toothed belt 26. In addition, the article transfer device 2B of the present embodiment is provided with article support platforms 14 for supporting an article W from below.

To be more specific, the article transfer device 2B has a pair of slide devices 15 (15a, 15b) which are spaced apart from each other along the X-direction. In addition, the article transfer device 2B has a pair of article support platforms 14 (14a, 14b) which are spaced apart from each other along the X-direction such that the article support platforms 14 (14a, 14b) are located between the pair of slide devices 15. And the projecting and retracting operation for moving the pair of slide device 15 along the Y-direction, and an operation for changing the distance between the pair of slide devices 15 can be performed. More specifically, an article W can be held between the pair of slide devices 15 by changing the distance between the pair of slide devices 15 depending on the width of the article W. In addition, the pair of slide devices 15 can be projected and retracted along the Y-direction with an article W held between the pair of the slide devices 15; that is, an article W placed on a shelf board 7 can be transferred toward, or in the direction of, the carriage main body 2A, and an article W held by the carriage main body 2A can be transferred toward, or in the direction of, a shelf board 7.

The article transfer device 2B includes the projecting and retracting motor 22 for projecting and retracting the pair of slide devices 15 along the Y-direction, and an electric motor 23 for clamping (clamping motor 23 for short) for changing the distance between the pair of slide devices.

The mechanism for performing the projecting and retracting operation of the pair of slide devices 15 is described next.

As shown in FIG. 3, each of the pair of slide devices 15 has a distal end member 20, a relay member 19 which supports the distal end member 20 such that the distal member 20 can slide and be moved along the Y-direction, a base member 18 which supports the relay member 19 such that the relay member 19 can slide and be moved along the Y-direction, and an operatively connecting member 21 which operatively connects the base member 18, the relay member 19, and the distal end member 20 with each other. With "inward side" being defined to be a side along the X-direction on which an article support platform 14 is located with respect to the corresponding slide device 15, then the base member 18, the relay member 19, and the distal end member 20 are located next to each other along the X-direction such that the relay member 19 is located on the inward side of the corresponding base member 18 along the X-direction and the distal end member 20 is located on the inward side of the corresponding relay member 19 along the X-direction.

The operatively connecting members 21 consist of a first operatively connecting belt 21a which operatively connects the base member 18, the relay member 19, and the distal end member 20 of one slide device 15a with each other, and a second operatively connecting belt 21b which operatively connects the base member 18, the relay member 19, and the distal end member 20 of the other slide device 15b with each other. Because of the actions of the operatively connecting members 21, when the relay members 19 are moved along the Y-direction with respect to the respective base members 18, the distal end members 20 are also moved along the Y-direction with respect to the respective relay members 19.

A projecting and retracting unit 24 having the toothed belt 26 is provided to each of the pair of slide devices 15. Each projecting and retracting unit 24 is arranged such that its toothed belt 26 is driven and circulated along its longitudinal direction with the rotation of the projecting-and-retracting drive shaft 25. A rack 27 formed in the lower face of the relay member 19 meshes with the toothed belt 26.

When the projecting-and-retracting drive shaft 25 is driven and rotated by the projecting and retracting motor 22, the toothed belts 26 of the pair of projecting and retracting units 24 are driven and circulated along their longitudinal direction. And the circulation of the toothed belts 26 causes the relay members 19 to be moved along the Y-direction with respect to the base member 18. As the distal end members 20 are moved along the Y-direction with respect to the respective relay members 19 because of the actions of the operatively connecting members 21, the slide devices 15 are projected and retracted along the Y-direction.

Thus, the projecting and retracting motor 22 is used to switch or change, by causing the relay member 19 and the distal end member 20 to slide and be moved, to a retracted state (see FIG. 2) in which each of the pair of slide devices 15 is retracted along the Y-direction toward the carriage main body 2A, and to a projected state (see FIGS. 3 and 4) in which each of the pair of slide devices 15 are projected from the carriage main body 2A along the Y-direction. In this projected state, the end portion of each distal end member 20 that is on the retracting direction side is located on a projecting direction side of the end portion of the corresponding base member 18 that is on the projecting direction side. Note that, while not shown, the slide devices 15 can be projected to both sides of the carriage main body 2A along the Y-direction.

In addition, a circulating belt 28 (i.e., belt that can be circulated) is connected to the slide device 15a. And the distance between the pair of slide devices 15 can be changed by causing the circulating belt 28 to circulate along its longitudinal direction by the actuating action of the clamping motor 23 and thus causing the slide device 15a to be moved along the X-direction.

In addition, as shown in FIGS. 3 and 4, a hook unit 29 is provided to each of the end portions, along the Y-direction of, the distal end members 20. Each hook unit 29 has a hook 29a which is pivotable about an axis that extends along the Y-direction, and an electric motor 29b for moving the hook 29a ("hook moving motor" for short) for changing the attitude of the hook 29a to a contact attitude (see FIGS. 3 and 4) in which the hook 29a is in a rotated position, and to an out-of-the-way attitude (see FIG. 2) in which the hook 29a extends vertically. When the slide devices 15 are projected and retracted with each hook 29a (which functions as a contact member) in its contact attitude, the hooks 29a come into contact with an article W so that the article W can be moved with the movement of the slide devices 15 with the hooks 29a remaining in contact with the article W.

As described above, an article W can be transferred from the article support platforms 14 to a shelf board 7 or to a relay conveyor 3, and from a shelf board 7 or a relay conveyor 3 to the article support platforms 14, by changing the distance between the pair of slide devices 15 by means of the actuating action of the clamping motor 23 to a suitable distance for the lateral width of the article W, by switching or changing the state of the pair of slide devices 15 to the retracted state and to the projected state by means of the actuating action of the projecting and retracting motor 22, and by changing the attitudes of the hooks 29a to the contact attitude and to the out-of-the-way attitude by means of the actuating action of the hook moving motor 29b.

Figure 5:
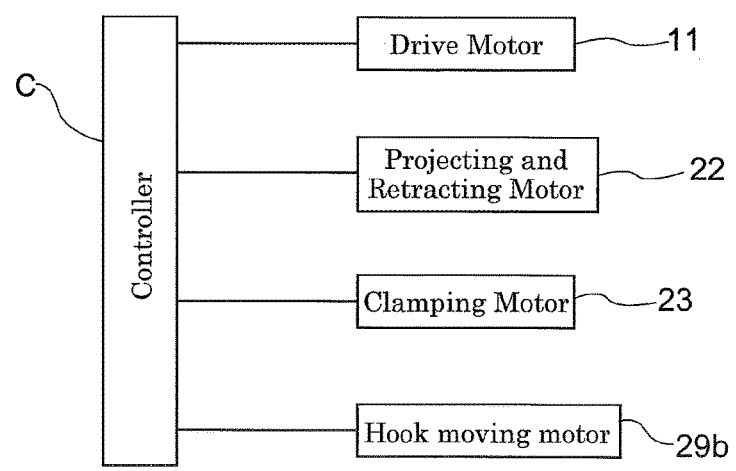
FIG. 5 is a functional block diagram of the article transfer device.

FIG. 5 is a functional block diagram of the article transport 2. As described above, the operation of the article transport 2 is controlled by controlling operation of each of the drive electric motor 11 (drive motor for short), the projecting and retracting motor 22, the clamping motor 23, and the hook moving motors 29b. The controller C provided to the article transport 2 controls operation of each of the drive motor 11, the projecting and retracting motor 22, the clamping motor 23, and the hook moving motors 29b. In addition, the controller C functions also as an actuation controller which controls operations of the actuating mechanism (the projecting and retracting motor 22, the projecting-and-retracting drive shaft 25, the toothed belts 26, and the slide devices 15). The controller C (actuation controller) has a processor, such as a microcomputer, as well as peripheral circuits, such as a memory circuit. And each function of the controller C (actuation controller) is performed through collaboration between such hardware and computer programs that are executed on hardware, such as a processor.

The technical features of the controller C (actuation controller) disclosed in the present description can also be applied to a control method of an article transfer device and a control method of an article transport facility; thus, such control methods are also disclosed in the present description. More specifically, a step of performing a first control, a step of performing a second control, a step of performing a third control, etc. are disclosed in the present description.

The operation of the article transfer device 2B is described next.

Figure 6:
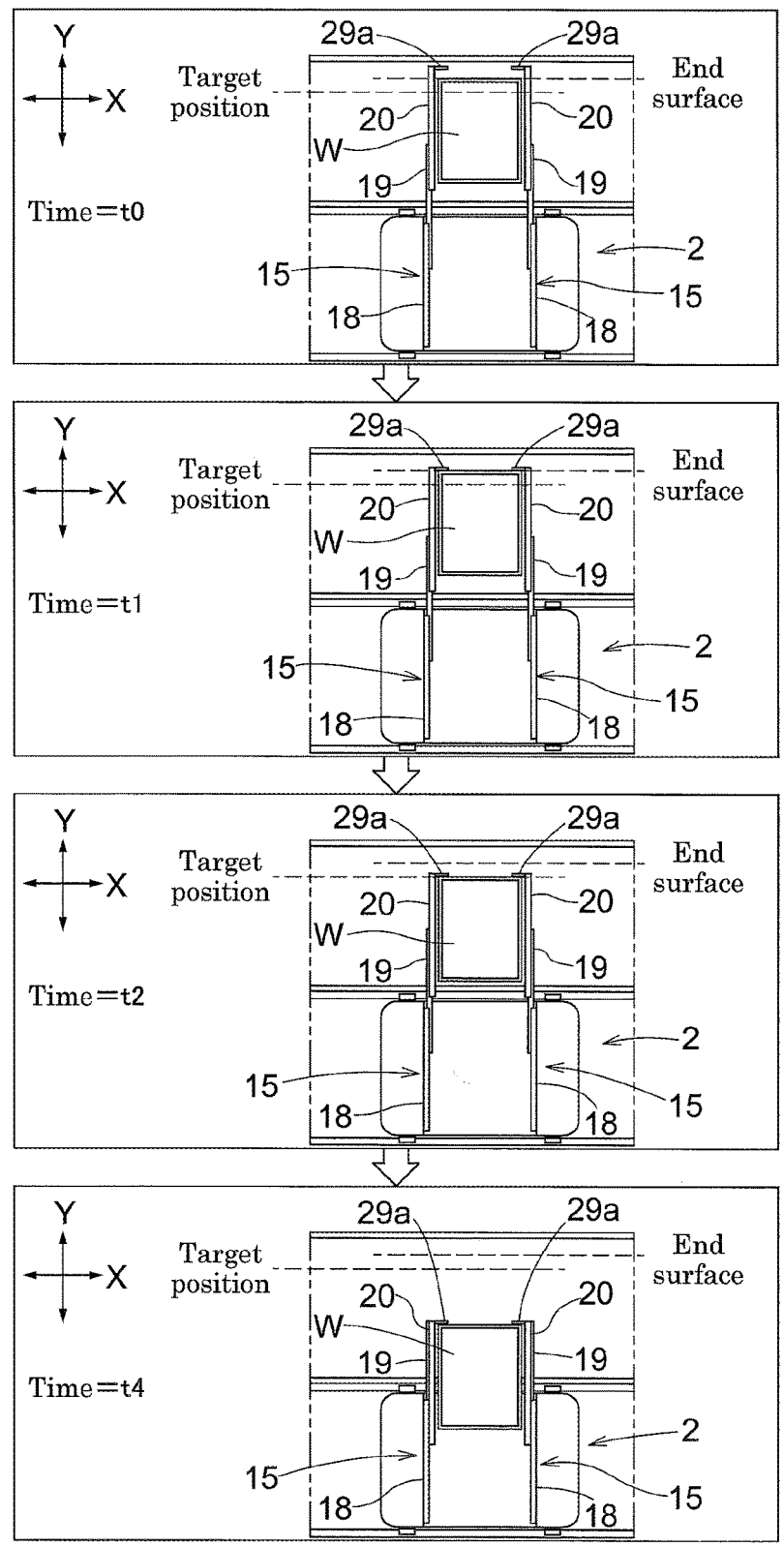
FIG. 6 is a group of drawings for describing the steps of transferring an article using the article transfer device.

FIG. 6 is a group of drawings for describing the steps of transferring an article W using the article transfer device 2B. As describes below, when transferring an article W using the article transfer device 2B, the controller C continuously performs a process of providing the projecting and retracting motor 22 with a command value (i.e. process of sending to the projecting and retracting motor 22 a signal or signals that represent the command value) that depends on the error between the actual rotational speed and a preset target rotational speed of the projecting and retracting motor 22 so as to cause the actual rotational speed of the projecting and retracting motor 22 to approach the target rotational speed. More specifically, the controller C provides the projecting and retracting motor 22 with a command value that would increase the rotational speed of the projecting and retracting motor 22 when the actual rotational speed of the projecting and retracting motor 22 is less than the target rotational speed (i.e., when the error has a positive value), and provides the projecting and retracting motor 22 with a command value that would decrease the rotational speed of the projecting and retracting motor 22 when the actual rotational speed of the projecting and retracting motor 22 is greater than the target rotational speed (i.e., when the error has a negative value). The target rotational speed is set separately for each of the first control, the second control, and the third control, described below.

Figure 7:
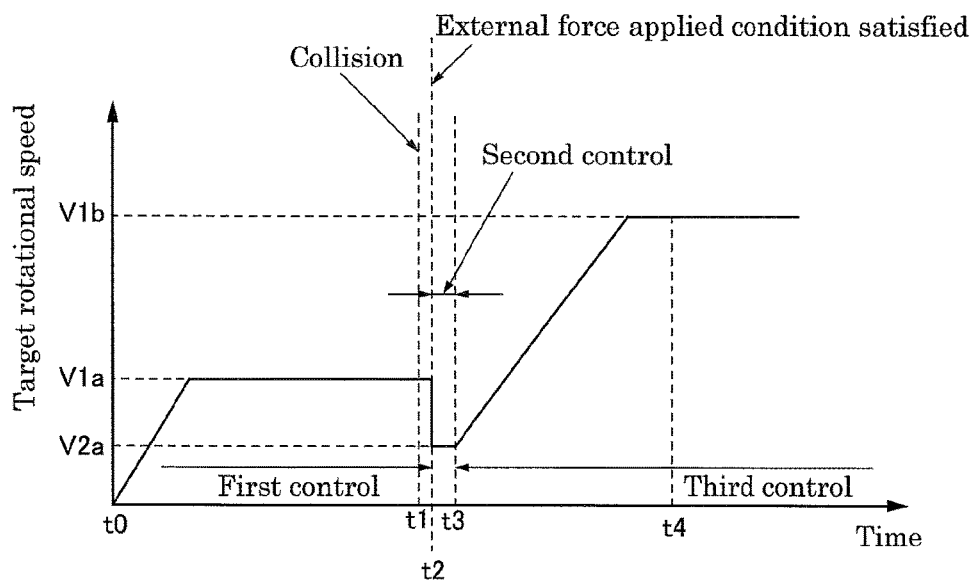
FIG. 7 is a drawing for schematically describing the time change in the target rotational speed of a projecting and retracting motor.
Figure 8:
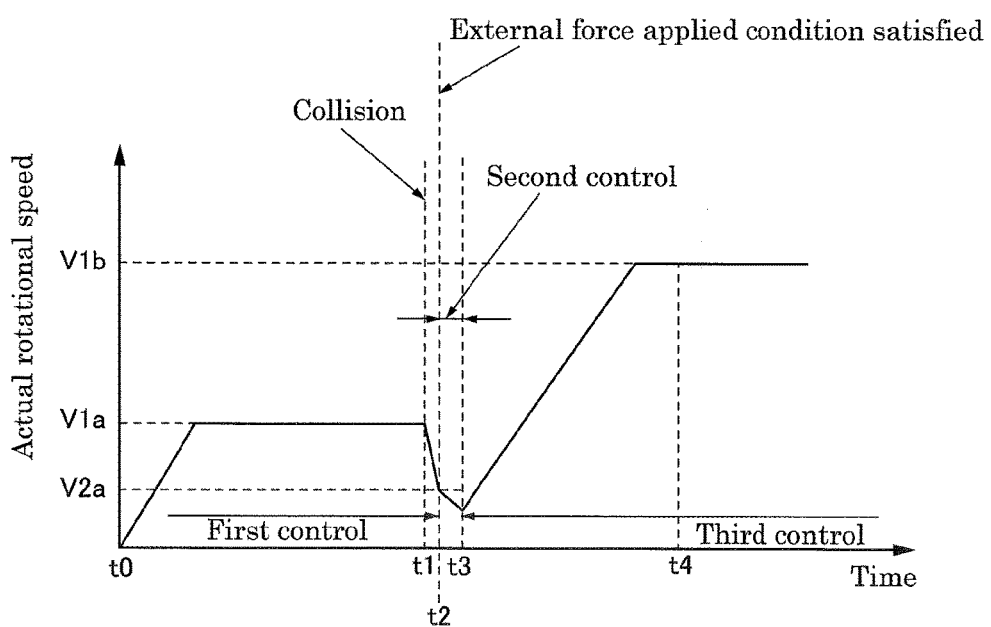
FIG. 8 is a drawing for schematically describing the time change in the actual rotational speed of the projecting and retracting motor.

FIG. 7 is a drawing for schematically describing the time change in the target rotational speed of the projecting and retracting motor while FIG. 8 is a drawing for schematically describing the time change in the actual rotational speed of the projecting and retracting motor. In the example shown in FIGS. 7 and 8, in the first control performed during a preliminary step for causing the hooks 29a to come into contact with an article W and immediately after the contact, the aim is to get the actual rotational speed of the projecting and retracting motor 22 to be equal to the speed V1a, whereas, in the third control which comes after the hooks 29a are in contact with the article W, the aim is to get the actual rotational speed of the projecting and retracting motor 22 to be equal to the speed V1b. The second control is performed between the first control and the third control. Note that the change in the actual rotational speed of the projecting and retracting motor 22 shown in FIG. 8 is shown only to illustrate an example, and may not accurately depict the actual speed change.

In the present example, as shown in FIG. 6, the slide device 15 is in the projected state at time t0, and the hooks 29a are at a retracting movement starting position which is on the projecting direction side of the article W along the Y-direction. And during the time from the starting of the projecting and retracting motor 22 to cause the slide device 15 to move toward the retracted state until the hooks 29a arrive at a target position (i.e., from time t0 to time t2), the operation of the projecting and retracting motor 22 is controlled by the first control described below. The target position is set based on an expected contact position at which the hooks 29a are expected to come into contact with the article W. For example, the target position is set to be a position displaced in the retracting direction (toward the carriage main body 2A) by a preset distance from the end surface (position at which the contact is expected to take place) of the article W. Therefore, the hooks 29a should be in contact with the articles W, when the hooks 29a arrive at the target position.

In the example shown in FIGS. 6 and 7, the hooks 29a arrive at the target position at time t2.

Under such conditions, the controller C provides the projecting and retracting motor 22 with a command for causing the slide device 15 to be moved to the retracted state. In the example described in the present embodiment, the controller C has stored in memory (not shown), etc., a speed change pattern of a first target rotational speed which is a function of the operating time of the projecting and retracting motor 22, based on the characteristics of the projecting and retracting motor 22, etc. In the first control, the controller C determines the first target rotational speed based on the present operating time of the projecting and retracting motor 22 and the aforementioned speed change pattern, during the time period between the beginning of the operation of the projecting and retracting motor 22 at time t0 and the actual rotational speed of the projecting and retracting motor 22 reaching the upper limit rotational speed (V1a). And the controller C performs the first control for continuously performing the process of providing the projecting and retracting motor 22 with a command value that depends on the error between the actual rotational speed of the projecting and retracting motor 22 and the first target rotational speed so as to cause the actual rotational speed of the projecting and retracting motor 22 to approach the determined first target rotational speed. In the example shown in FIG. 7, the first target rotational speed increases with the operating time of the projecting and retracting motor 22 as shown in FIG. 7. Subsequently, when the actual rotational speed of the projecting and retracting motor 22 reaches the upper limit rotational speed (V1a) set in advance for the first control, the controller C maintains the first target rotational speed at the upper limit rotational speed (V1a).

As the result of this first control being performed, the actual rotational speed of the projecting and retracting motor 22 is caused to be equal to the speed V1a; and the hooks 29a are also moved at the corresponding speed. And the hooks 29a approach the article W, and contact the article W at time t1. When the hooks 29a come into contact with the article W, the load due to the article W is transmitted to the projecting and retracting motor 22 through the slide devices 15, etc., which causes a decrease in the rotational speed of the projecting and retracting motor 22. In the present embodiment, when the hooks 29a are moved and arrive at the target position, the controller C determines that an external force applied condition, that an external force that causes a decrease in the rotational speed of the projecting and retracting motor 22 is applied to the hooks 29a moved by the projecting and retracting motor 22 , is satisfied. The controller C monitors the state, or history, of rotation of the projecting and retracting motor 22 using a rotary encoder etc., for example, and can learn the travel distance of the hooks 29a based on the state of rotation. And the controller C can learn and keep track of the current position of the hooks 29a (for example, the fact that the hooks 29a arrived at the target position) based on the initial position of the hooks 29a and the travel distance of the hooks 29a from their initial position. Thus, the controller C can determine whether or not the external force applied condition is satisfied based on the position of the hooks 29a, without having to directly detect the fact that an external force which can causes a decrease in the rotational speed of the projecting and retracting motor 22 is applied to the hooks 29*a* moved by the projecting and retracting motor 22.

When the aforementioned external force applied condition is satisfied while performing the first control, the controller C, subsequent to the first control, performs a second control for providing the projecting and retracting motor 22 with a command value that would allow the actual rotational speed of the projecting and retracting motor 22 to be equal to, and to fall below, the first target rotational speed at the time of the external force applied condition becoming satisfied. In the example shown in FIGS. 7 and 8, the second control is temporarily performed between time t2 and time t3. For example, in the second control, the controller C continuously performs the process of providing the projecting and retracting motor 22 with a command value that depends on the error between the actual rotational speed of the projecting and retracting motor 22 and a set second target rotational speed so as to cause the actual rotational speed of the projecting and retracting motor 22 to approach the second target rotational speed. During the time the controller C is performing the second control, the second target rotational speed is set to be and maintained at the same speed as the actual rotational speed (V2*a*) of the projecting and retracting motor 22 at the time (time t2) of the external force applied condition becoming satisfied. In other words, even if the rotational speed of the projecting and retracting motor 22 is decreased (i.e. even if the error increases) as a result of the hooks 29*a* coming into contact with the article W and of the load due to the article W being transmitted to the projecting and retracting motor 22, the actual rotational speed at the time of the speed decrease is provided to the projecting and retracting motor 22 as the second target rotational speed; thus, the actual rotational speed of the projecting and retracting motor 22 is allowed to be equal to, and to fall below, the first target rotational speed (V1*a*) at the time of the external force applied condition becoming satisfied. In other words, the second control is started with the second target rotational speed being equal to the actual rotational speed of the projecting and retracting motor 22, i.e., with the error being zero. Thus, when the second control is started, the projecting and retracting motor 22 does not accelerate suddenly, and the hooks 29*a* and the article W are moved at the same speed. In addition, even if the rotational speed of the projecting and retracting motor 22 decreases because the external force applied condition is satisfied, the error is zero at the beginning of the second control and then starts to change from that value; thus, the error does not increase rapidly. As a result, while the second control is performed, any large changes in the actual rotational speed of the projecting and retracting motor 22 would be suppressed. In the example shown in FIGS. 7 and 8, the actual rotational speed of the projecting and retracting motor 22 stays low from time t2 to time t3.

When a condition for terminating the second control is satisfied while performing the second control, the controller C, subsequent to the second control, performs a third control for continuously performing the process of providing the projecting and retracting motor 22 with a command value that depends on the error between the actual rotational speed of the projecting and retracting motor 22 and a third target rotational speed so as to cause the actual rotational speed of the projecting and retracting motor 22 to approach the third target rotational speed. In the third control of the present embodiment, the controller C performs the same control as the first control described above. More specifically, the controller C determines the third target rotational speed based on the operating time of the projecting and retracting motor 22 since the beginning of the third control and a speed change pattern stored in memory (not shown), etc. in advance. Note that, in the example described in the present embodiment, an upper limit (V1*b*) for the third target rotational speed is set in the third control.

In the example shown in FIG. 7, the third target rotational speed increases with the operating time of the projecting and retracting motor 22 from time t3 on as shown in FIG. 7. Subsequently, when the actual rotational speed of the projecting and retracting motor 22 reaches the upper limit rotational speed (V1*b*) set in advance for the third control, the controller C maintains the third target rotational speed at the upper limit rotational speed (V1*b*). In the example shown in FIGS. 7 and 8, the third target rotational speed and the actual rotational speed of the projecting and retracting motor 22 have reached, and are, V1*b* by time t4.

In the present embodiment, the controller C determines that the terminating condition for the second control is satisfied when time t3 is reached. For example, the controller C determines that the terminating condition for the second control is satisfied when a set time period elapses since the beginning of the second control. In other words, the second control is performed temporarily during the set time period, any large changes in the actual rotational speed of the projecting and retracting motor 22 would be suppressed during this set time period by the second control. And the controller C terminates the second control and switches to the third control as described above when the set time period elapses since time t2, and time t3 is reached.

As such, when the external force applied condition is satisfied and the rotational speed of the projecting and retracting motor 22 is decreased while performing the first control, the controller C, subsequent to the first control, performs a second control for providing the projecting and retracting motor 22 with a command value that would allow the actual rotational speed of the projecting and retracting motor 22 to be equal to, and to fall below, the first target rotational speed at the time of the external force applied condition becoming satisfied. In other words, even if the rotational speed of the projecting and retracting motor 22 decreases as a result of the external force applied condition becoming satisfied, no commands, that would cause the projecting and retracting motor 22 to operate at a greater rotational speed than the first target rotational speed at the time of the external force applied condition becoming satisfied, will be provided to the projecting and retracting motor 22 while the controller C is performing the second control which comes after the first control. As a result, any large changes in the actual rotational speed of the projecting and retracting motor 22 would be suppressed while the second control is performed, which reduces the likelihood of the occurrence of the problem with a conventional device that large changes or fluctuations in the actual rotational speed of the projecting and retracting motor 22 are repeated and thus collisions and separations between the contact members and the article are repeated. In addition, since an article W can be transferred at a steady moving speed, this can reduce the likelihood of the occurrence of objects held within the article W falling out of place or falling over. In addition, even when the article W is a container having an opening Wa that opens upward, the likelihood of the objects held within the article W getting thrown out from the opening Wa is reduced.

In addition, in the example shown in FIGS. 7 and 8, the control is performed such that the hooks 29*a* are caused to collide with the article W at a relatively low speed by the first control, and are subsequently caused to be moved at relatively high speeds with the article W by the third control to transfer the article W. In other words, since the hooks 29*a* come into contact with the article W at a relatively low speed, the impact force on the article W can be reduced. In addition, after the hooks 29*a* come into contact with the article W at a relatively low speed, the article W can be transferred at relatively high speeds by the hooks 29*a*.

<Second Embodiment>

The second embodiment differs from embodiment described above in the content of the second control. In the following description of the article transfer device and the article transport facility of the second embodiment, the structures and arrangements of the second embodiment that are identical or similar to those in the embodiment described above will be omitted.

Figure 9:
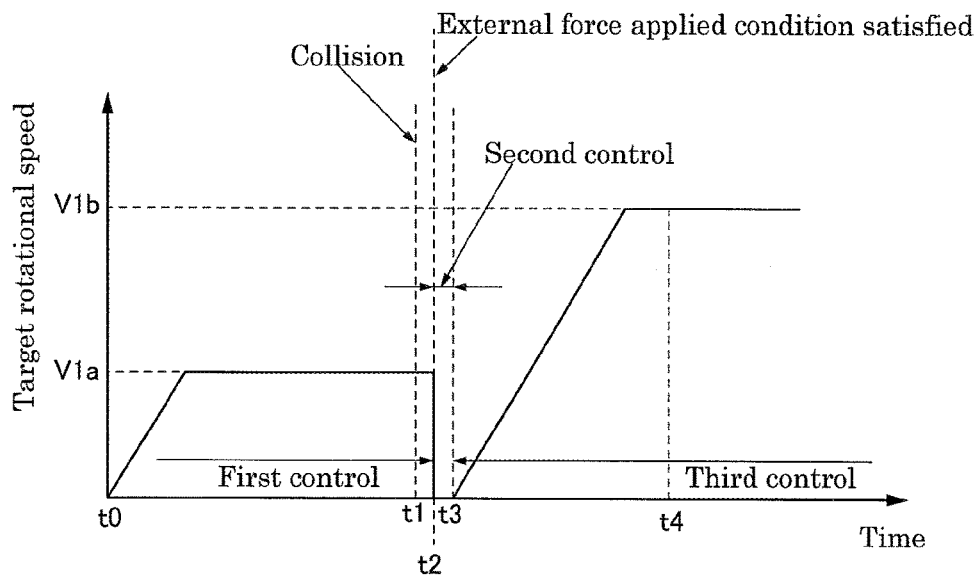
FIG. 9 is a drawing for schematically describing the time change in the target rotational speed of the projecting and retracting motor.
Figure 10:
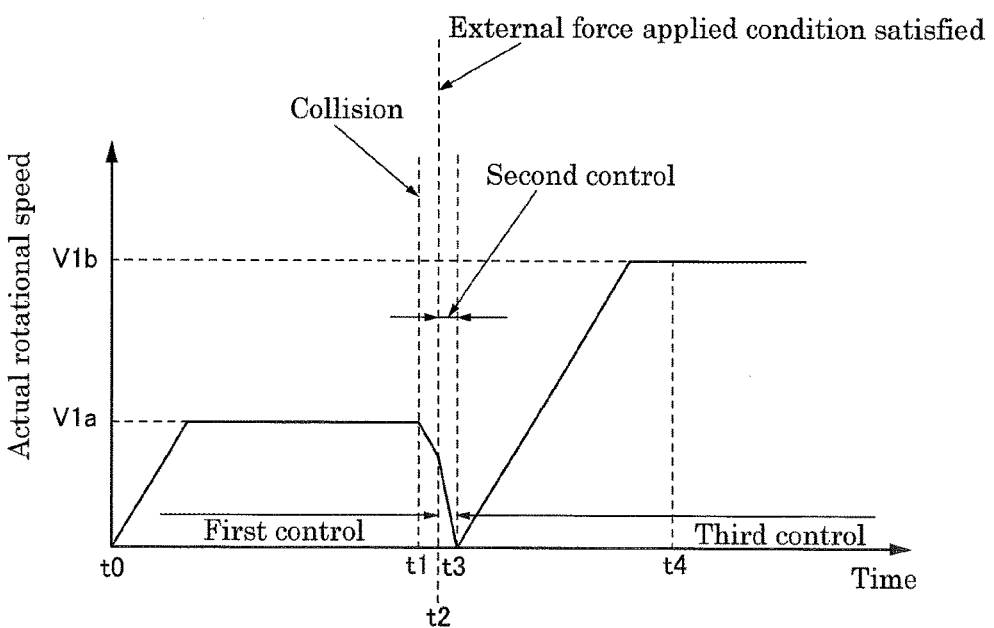
FIG. 10 is a drawing for schematically describing the time change in the actual rotational speed of the projecting and retracting motor.

FIG. 9 is a drawing for schematically describing the time change in the target rotational speed of the projecting and retracting motor while FIG. 10 is a drawing for schematically describing the time change in the actual rotational speed of the projecting and retracting motor. In the example shown in FIGS. 9 and 10, in the first control performed during a preliminary step for causing the hooks 29*a* to come into contact with an article W and immediately after the contact, the aim is to get the actual rotational speed of the projecting and retracting motor 22 to be equal to the speed V1*a*, whereas, in the third control which comes after the hooks 29*a* are in contact with the article W, the aim is to get the actual rotational speed of the projecting and retracting motor 22 to be equal to the speed V1*b*. Note that the change in the actual rotational speed of the projecting and retracting motor 22 shown in FIG. 10 is shown only to illustrate an example, and may not accurately depict the actual speed change.

When the aforementioned external force applied condition is satisfied while performing the first control that is identical to that described in the first embodiment, the controller C, subsequent to the first control, performs a second control for continuously performing the process of providing the projecting and retracting motor 22 with a command value that depends on an error between the actual rotational speed of the projecting and retracting motor 22 and a second target rotational speed so as to cause the actual rotational speed of the projecting and retracting motor 22 to approach the second target rotational speed. In the example shown in FIGS. 9 and 10, the second control is performed temporarily between time t2 and time t3. For example, the controller C sets and maintains the second target rotational speed at zero for the duration of the time it performs the second control. More specifically, even if the rotational speed of the projecting and retracting motor 22 is decreased (i.e. even if the error increases) as a result of the hooks 29*a* coming into contact with the article W and of the load due to the article W being transmitted to the projecting and retracting motor 22, the actual rotational speed of the projecting and retracting motor 22 comes to have values close to zero while the second control is performed. To describe this more specifically, since the actual rotational speed of the projecting and retracting motor 22 is greater than the second target rotational speed (zero), the error becomes less than zero (i.e. error becomes negative); thus, the actual rotational speed is decreased further and approaches zero. As a result, any occurrences of an increase in the actual rotational speed of the projecting and retracting motor 22 is reduced or prevented while performing the second control. In the example shown in FIGS. 9 and 10, the rotational speed of the projecting and retracting motor 22 is decreased and the actual rotational speed approaches zero, between time t2 and time t3 by the second control as shown.

<Third Embodiment>

The third embodiment differs from the second embodiment in the content of the second control. In the following description of the article transfer device and the article transport facility of the third embodiment, the structures and arrangements of the third embodiment that are identical or similar to those in the embodiment described above will be omitted.

Figure 11:
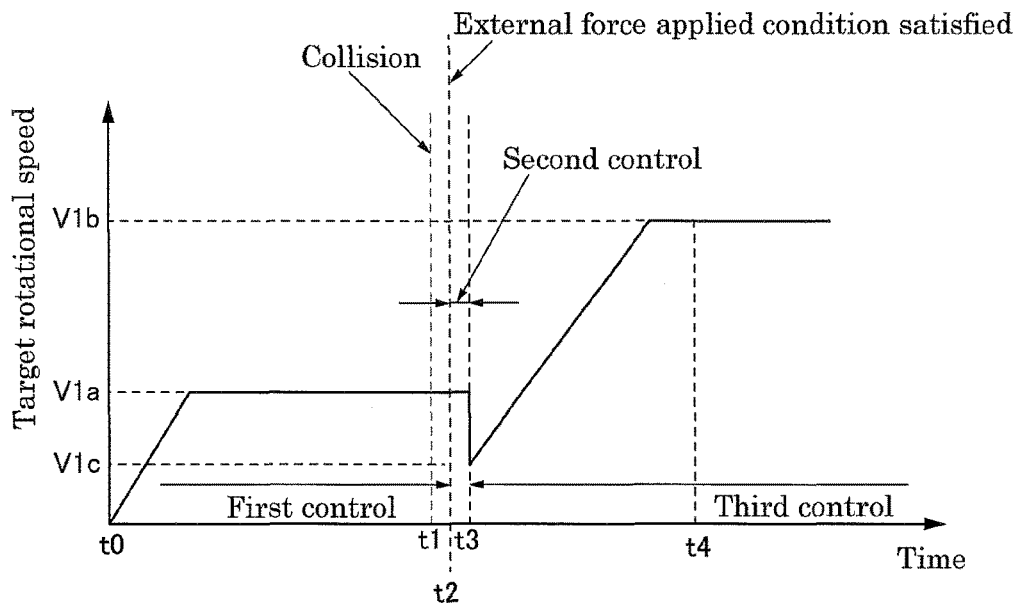
FIG. 11 is a drawing for schematically describing the time change in the target rotational speed of the projecting and retracting motor.
Figure 12:
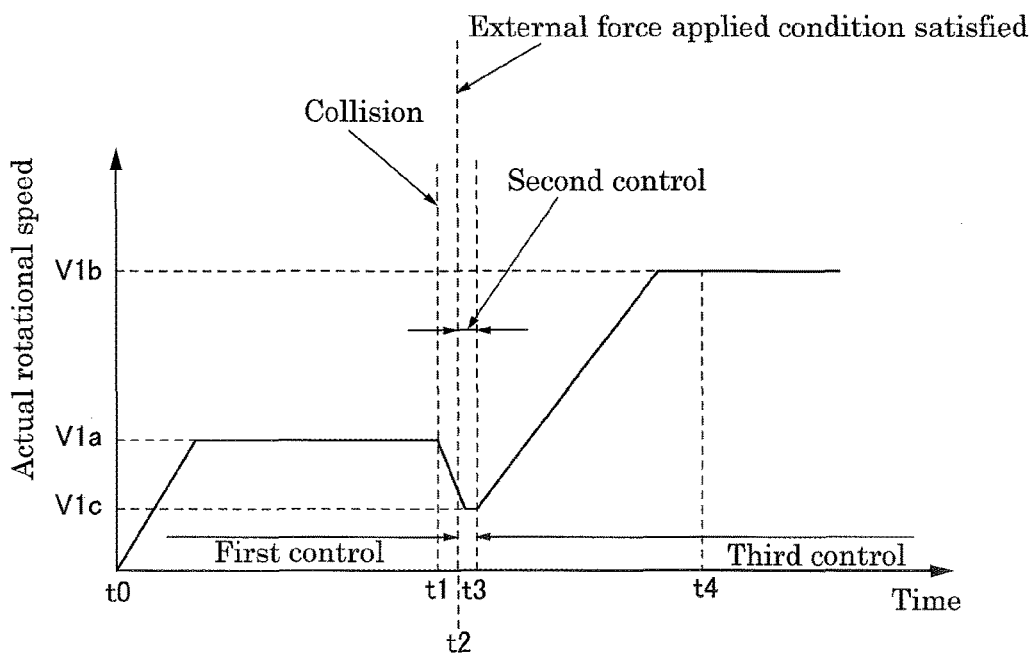
FIG. 12 is a drawing for schematically describing the time change in the actual rotational speed of the projecting and retracting motor.

FIG. 11 is a drawing for schematically describing the time change in the target rotational speed of the projecting and retracting motor while FIG. 12 is a drawing for schematically describing the time change in the actual rotational speed of the projecting and retracting motor. As shown in FIGS. 11 and 12, during the first control performed in a preliminary step for causing the hooks 29*a* to come into contact with an article W, the aim is to get the actual rotational speed of the projecting and retracting motor 22 to be equal to the speed V1*a*, whereas, in the third control which comes after the hooks 29*a* come into contact with the article W, the aim is to get the actual rotational speed of the projecting and retracting motor 22 to be equal to the speed V1*b*. Note that the change in the actual rotational speed of the projecting and retracting motor 22 shown in FIG. 12 is shown only to illustrate an example, and may not accurately depict the actual speed change.

When the aforementioned external force applied condition is satisfied while performing the first control that is identical to that described in the first embodiment, the controller C, subsequent to the first control, performs a second control for continuously performing the process of providing the projecting and retracting motor 22 with a command value that depends on an error between the actual rotational speed of the projecting and retracting motor 22 and a second target rotational speed so as to cause the actual rotational speed of the projecting and retracting motor 22 to approach the second target rotational speed. In the example shown in FIGS. 11 and 12, the second control is performed temporarily between time t2 and time t3. For example, while performing the second control, the controller C sets the second target rotational speed to be the same speed as the first target rotational speed (V1*a*) at the time of the external force applied condition becoming satisfied. In other words, even if the rotational speed of the projecting and retracting motor 22 is decreased (i.e. even if the error increases) as a result of the hooks 29*a* coming into contact with the article W and of the load due to the article W being transmitted to the projecting and retracting motor 22, the target rotational speed is not increased while the second control is performed and is maintained at the same speed (V1*a*); thus, the error remains relatively small compared with the case in which the target rotational speed is increased. And thus, while the second control is performed, the actual rotational speed of the projecting and retracting motor 22 would not become substantially greater than the actual rotational speed of the projecting and retracting motor 22 at the time of the external force applied condition becoming satisfied. As a result, any occurrences of a large change or fluctuation in the actual rotational speed of the projecting and retracting motor 22 is reduced or prevented while performing the second control. In the example shown in FIGS. 11 and 12, the actual rotational speed of the projecting and retracting motor 22 approaches V1*c* between time t2 and time t3 by the second control as shown.

Note that the error between the actual rotational speed of the projecting and retracting motor 22 and the second target rotational speed becomes greater as the actual rotational speed of the projecting and retracting motor 22 decreases. However, in the present embodiment, the projecting and retracting motor 22 does not accelerate suddenly in response to the error because the controller C switches from the second control to the third control.

<Fourth Embodiment>

The situation in which an external force applied condition (that an external force that causes a decrease in the rotational speed of the projecting and retracting motor 22 is applied to the hooks 29*a* moved by the projecting and retracting motor 22) is satisfied is not limited to the example shown in FIGS. 6-8. For example, an external force that causes a decrease in the rotational speed of the projecting and retracting motor 22 may also be applied to the hooks 29*a* when the article W transferred by the hooks 29*a* hits, or collides with, a step etc.

Figure 13:
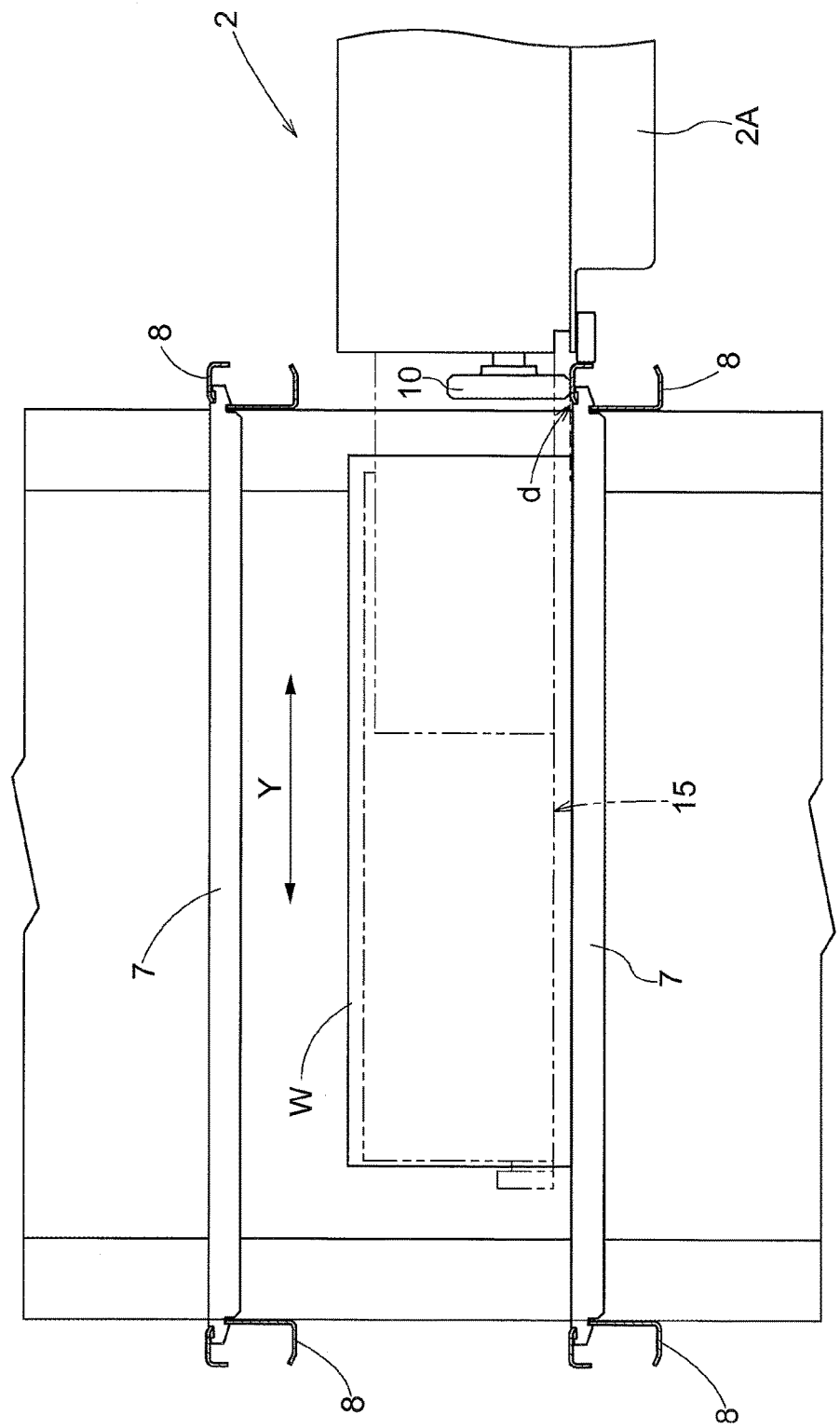
FIG. 13 is a drawing schematically showing a step between a shelf board of an article support portion and a travel rail.

FIG. 13 is a drawing that schematically shows a step "d" between a shelf board 7 of an article support portion 1 and a travel rail 8. As shown in the drawing, the travel rail 8 is mounted to an end portion of the shelf board 7 of the article support portion 1. In addition, the step "d" exists between the top surface of the shelf board 7 on which the article W is placed and the top surface of the travel rail 8 to prevent the article W falling. More specifically, even if an article W placed on a shelf board 7 is unintentionally moved by vibrations etc. that may occur, for example, when the article transport 2 travels, the article W would come into contact with the step "d" and its motion would be stopped; thus, the article W would be prevented from falling from the shelf board 7. Thus, when an article W is moved from the shelf board 7 in the direction of the carriage main body 2A of the article transport 2 along the Y-direction, a corner of the bottom portion of the article W collides with the travel rail 8 (that is, collides with the step "d"). In other words, an external force that causes a decrease in the rotational speed of the projecting and retracting motor 22 is applied to the hooks 29*a*.

Figure 14:
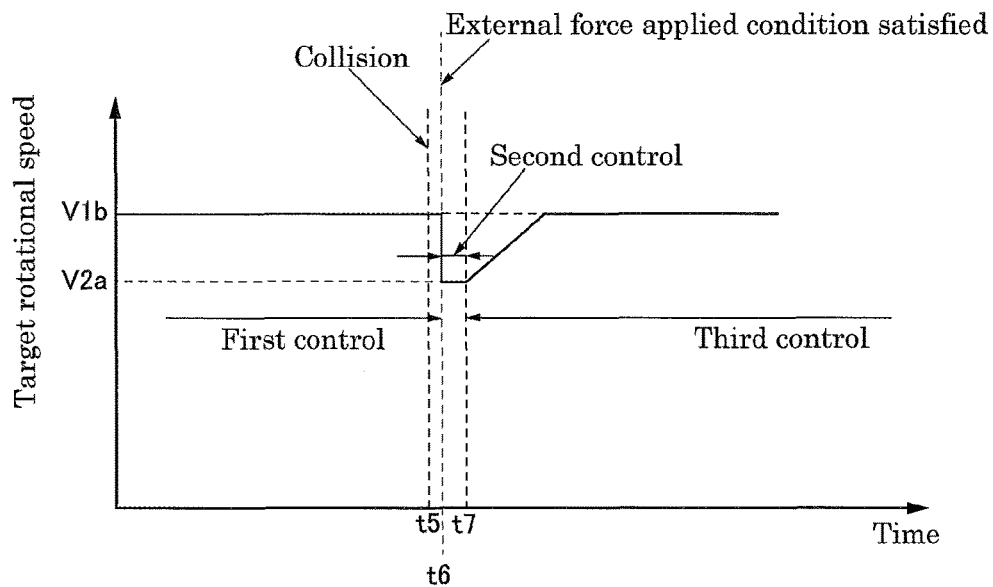
FIG. 14 is a drawing for schematically describing the time change in the target rotational speed of the projecting and retracting motor.
Figure 15:
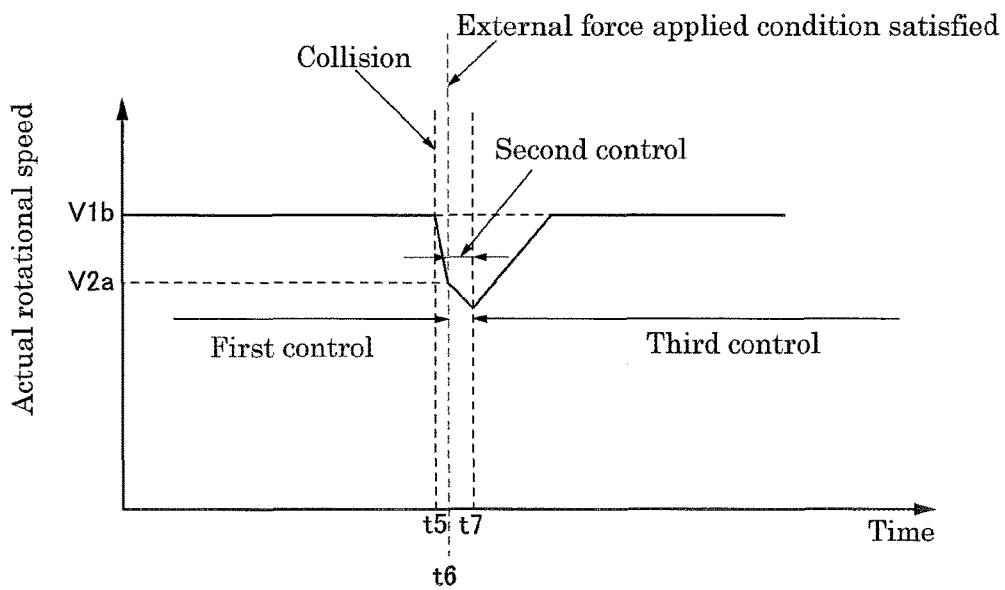
FIG. 15 is a drawing for schematically describing the time change in the actual rotational speed of the projecting and retracting motor.

FIG. 14 is a drawing for schematically describing the time change in the target rotational speed of the projecting and retracting motor 22 whereas FIG. 15 is a drawing for schematically describing the time change in the actual rotational speed of the projecting and retracting motor 22. Note that the change in the actual rotational speed of the projecting and retracting motor 22 shown in FIG. 15 is shown only to illustrate an example, and may not accurately depict the actual speed change. As described above, the controller C monitors the state, or history, of rotation of the projecting and retracting motor 22 using a rotary encoder etc., for example, and can learn the travel distance of the hooks 29*a* based on the state of rotation. And thus, the controller C can know that the hooks 29*a* arrived at a position of the hooks 29*a* at which the article W is expected to collide with the step "d", based on the initial position of the hooks 29*a*, the travel distance of the hooks 29*a* from their initial position, and the dimension, along the Y-direction, of the article W.

In this case also, when an external force applied condition (that an external force that causes a decrease in the rotational speed of the projecting and retracting motor 22 is applied to the hooks 29*a* moved by the projecting and retracting motor 22) is satisfied while the controller C is performing the first control in which the controller C continuously performs the process of providing the projecting and retracting motor 22 with a command value that depends on the error between the actual rotational speed and the target rotational speed of the projecting and retracting motor 22 so as to cause the actual rotational speed of the projecting and retracting motor 22 to approach a preset target rotational speed, then the controller C, subsequent to the first control, performs a second control for providing the projecting and retracting motor 22 with a command value that would allow the actual rotational speed of the projecting and retracting motor 22 to be equal to, and to fall below, the first target rotational speed at the time of the external force applied condition becoming satisfied. In the example shown in FIGS. 14 and 15, the article W approaches the step "d" and collides with the step "d" at time t5. And subsequently, the controller C determines that the external force applied condition is satisfied at time t6.

The controller C temporarily performs the second control between time t6 and time t7. The second control described with reference to FIGS. 14 and 15 of the present embodiment is the same as the second control described in the first embodiment described above. However, the second control described in the second embodiment or the third embodiment may be performed instead.

In case the second control shown in FIGS. 14 and 15 is performed, and during the time the controller C is performing the second control, the controller C sets and maintains the second target rotational speed to be the same speed as the actual rotational speed (V2*a*) of the projecting and retracting motor 22 at the time of the external force applied condition becoming satisfied. In other words, even if the actual rotational speed of the projecting and retracting motor 22 is decreased (i.e. even if the error increases) as a result of the article W colliding with the step "d" and of the load due to the article W being transmitted to the projecting and retracting motor 22, the actual rotational speed (V2*a*) at the time of the speed decrease is provided to the projecting and retracting motor 22 as the second target rotational speed; thus, the actual rotational speed of the projecting and retracting motor 22 is allowed to be equal to, and to fall below, the first target rotational speed (V1*a*) at the time of the external force applied condition becoming satisfied. As a result, the projecting and retracting motor 22 would not accelerate suddenly while the second control is performed. In the example shown in FIGS. 14 and 15, the actual rotational speed of the projecting and retracting motor 22 stays low from time t6 to time t7.

When a condition for terminating the second control is satisfied while performing the second control, the controller C, subsequent to the second control, performs a third control for continuously performing the process of providing the projecting and retracting motor 22 with a command value that depends on the error between the actual rotational speed of the projecting and retracting motor 22 and a third target rotational speed so as to cause the actual rotational speed of the projecting and retracting motor 22 to approach the third target rotational speed, as in the embodiment described above. The controller C determines that the terminating condition of the second control is satisfied at time t7. For example, as in the embodiment described above, the controller C determines that the terminating condition for the second control is satisfied when a set time period elapses after the beginning of the second control.

In addition, in the example shown in FIGS. 14 and 15, the control is performed such that the hooks 29*a* are caused to be moved at a relatively high speed by the first control, and are again caused to be moved at relatively high speeds after the external force applied condition is satisfied and the second control is performed. In other words, the control is performed such that, even if the external force applied condition is satisfied while transferring an article W at a relatively high speed (speed V1*b*) with the hooks 29*a* in contacted with the article W by the first control, the hooks 29a are moved with the article W at a relatively high speed (speed V1b) again after the second control is performed, to transfer the article W.

<Alternative Embodiments>

<1> In the embodiment described above, the specific structure of the article transfer device 2B is described in terms of a specific example. However, such a structure may be changed as appropriate.

For example, an example was described in which each slide device 15 has three members, namely, the distal end member 20, the relay member 19, and the base member 18, that are operatively connected to each other. However, each slide device 15 may have only two members (for example, the distal end member 20 and the base member 18).

<2> In the embodiments described above, an example is described in which the article support portion is formed by a plurality of vertical levels of shelf boards 7; however, the number of levels of the shelf boards 7 may be changed as appropriate. For example, the article support portion may consist of a single level of shelf boards 7.

Similarly, instead of the plurality of vertical levels of the travel rails 8, there may be only one level of travel rails 8.

In the embodiments described above, an example is described in which the travel rails 8 generally extend linearly; however, the structure and the shape of the travel rails 8 may be changed as appropriate. For example, the travel rails 8 may have a curved configuration or may form a loop.

In addition, a plurality of article support portions 1 may be installed along such generally linear, curved, or looped travel rails 8 such that the article support portions 1 are spaced apart from each other.

<3> The structure of the article transport facility in which the article transfer device in accordance with the present disclosure is incorporated may be changed as appropriate.

Figure 16:
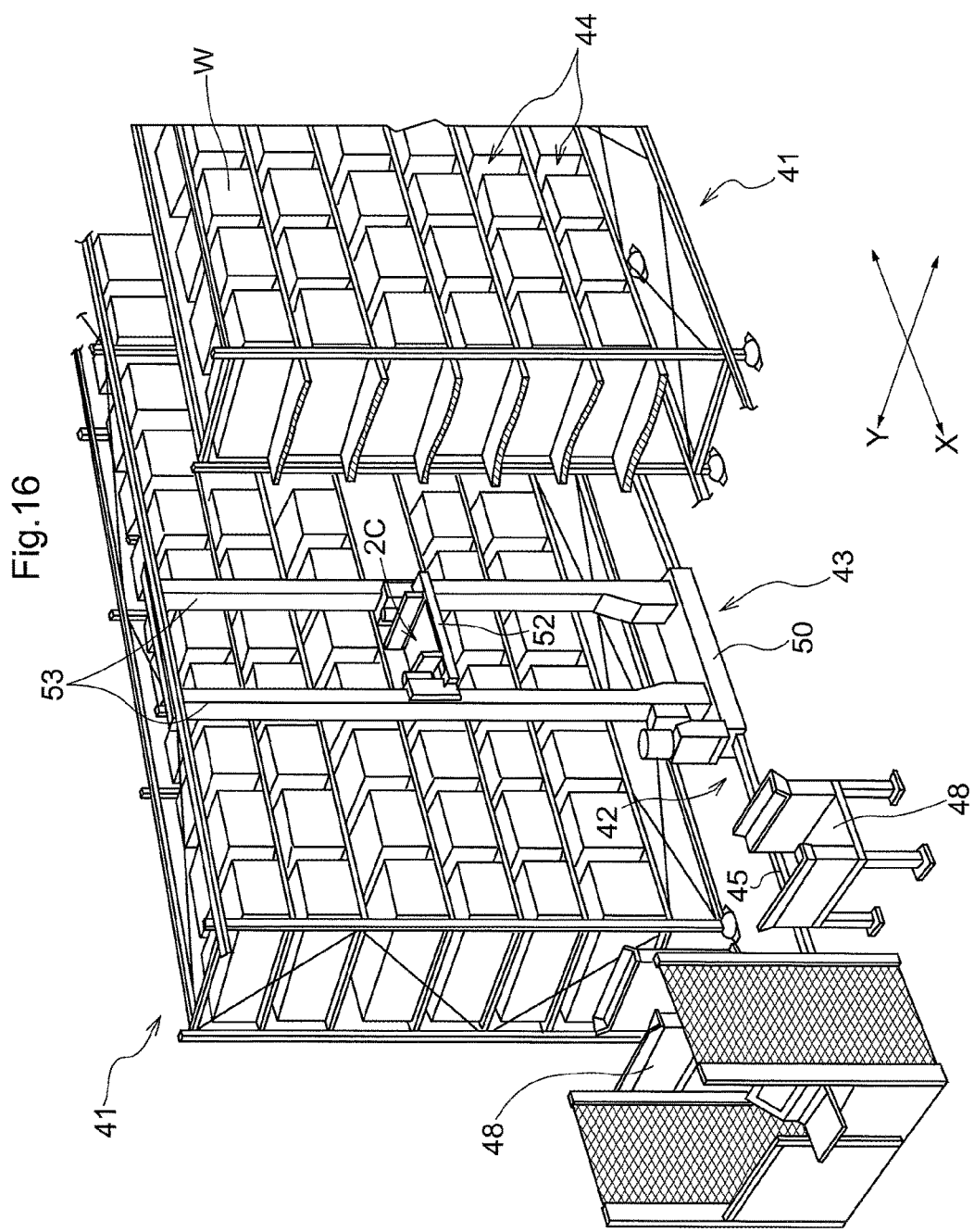
FIG. 16 is a perspective view of another article transport facility which incorporates an article transfer device.

FIG. 16 is a perspective view of another article transport facility which incorporates the article transfer device in accordance with the present disclosure. The article transport facility shown in FIG. 16 has a travel carriage (article transport) 50 to which the article transfer device 2C is mounted and which can travel along a travel path 42, and article support portions 41 for supporting articles W. The travel carriage 50 is configured to be capable of delivering an article to an article support portion 41 and receiving an article from an article support portion 41 by moving the article W along a transfer direction (Y-direction) by means of the article transfer device 2C at preset locations along a travel rail 45 provided along the travel path 42. In addition, in this article transport facility, the article transfer device 2C is configured to be movable along a horizontal direction and the vertical direction because the article transfer device 2C is configured to be raised and lowerd on the travel carriage 50. This article transfer device 2C has the same structure as the article transfer device 2B described in the embodiments described above.

To describe this in more detail, the article transport facility has a pair of article support portions 41 which are spaced apart from each other such that the direction along which articles W are carried into (or carried out of) one article support portion 41 is opposite from the direction along which articles W are carried into (or carried out of) the other article support portion 41, as well as a stacker crane 43 which travels automatically along the travel path 42 formed between these article support portions 41. Each article support portion 41 has a plurality of storage sections 44 each of which can store an article W such that the storage sections 44 form a plurality of vertical columns and horizontal rows. The travel rail 45 is installed in the travel path 42 and along the longitudinal direction (X-direction) of the article support portions 41. The travel carriage 50 of the stacker crane 43 can travel on the travel rail 45. A pair of load support platforms 48 are provided at one end area of the travel path 42 with the travel rail 45 located between the load support platforms 48.

The article transfer device 2C in accordance with the present embodiment is mounted on the stacker crane 43. To be more specific, the stacker crane 43 has the travel carriage 50 which can travel along the travel rail 45, a pair of vertical movement masts 53 each arranged vertically on the travel carriage 50, a vertically movable platform 52 supported by the vertical movement mast 53 for vertical movement, and the article transfer device 2C mounted on the vertically movable platform 52. And the stacker crane 43 transfers an article W between a load support platform 48, any one of the storage sections 44, and the article transfer device 2C of the stacker crane 42.

Note that the article transfer device may be moved along a horizontal direction and the vertical direction in an article transport facility having a structure that is different from that shown in FIG. 16. For example, a travel rail may be provided that allows the article transfer device 2C to be moved along the longitudinal direction (X-direction) of a article support portion 41. And the article transfer device 2C may be moved along a horizontal direction and the vertical direction by vertically moving the travel rail and the article transfer device 2C together.

An article transport facility in which the article transfer device in accordance with the present disclosure may be incorporated may have a different structure from those described so far.

One example of such an article transport facility would be where an article transport on which the article transfer device is mounted travels along a travel rail (travel path) installed at an elevated location such as on or near the ceiling. In such a case, the article transport may have a travel member which can move along, and below, the travel rail while being guided by the travel rail, a vertically movable member which can be vertically moved from, and with respect to, the travel member, and the article transfer device mounted on the vertically movable member. And the article transfer device mounted in the article transport transfers an article to or from any one of article support portions installed along the travel rail.

Another example is an article transport facility in which the travel path for the article transport is not defined by a travel rail described above. For example, the article transport may be of the type that can travel along a row of magnets provided in the floor. In other words, the travel path for the article transport is defined by the row of magnets. Alternatively, instead of the article transport being guided by a row of magnets as described above, the article transport may be of the type that can travel autonomously along a travel path that is programmed in advance while recognizing its own current position. And the article transfer device mounted in the article transport that travels in such a way may transfer an article to or from any one of article support portions installed along the travel path.

Yet another example of an article transport facility is one in which a transport vehicle that functions as an article transport in which the article transfer device is mounted is used to sort and carry the articles that are carried into a warehouse from outside and the articles that are carried out of the warehouse to outside. For example, the transport vehicle that functions as an article transport in which the article transfer device is mounted can transport articles between a carry in and out portion on which articles are placed temporarily when they are carried out from a storage structure that has articles stored therein and when they are carried into the storage structure, and a take in and out portion on which articles are placed temporarily when they are transported from the outside, and when they are taken out to the outside. In this case, each of the carry in and out portion and the take in and out portion, is, or correspond to, an "article support portion".

<4> The external force applied condition in the embodiments described above can be changed as appropriate.

For example, the controller C may be configured to determine that the external force applied condition is satisfied when the torque of the projecting and retracting motor 22 becomes greater than or equal to a predetermined torque. More specifically, while the first control is performed in which the process of providing a command value to the projecting and retracting motor 22 that depends on the error between the actual rotational speed and a target rotational speed of the projecting and retracting motor 22 is continuously performed so as to cause the actual rotational speed of the projecting and retracting motor 22 to approach a preset target rotational speed, if the load applied to the hooks 29*a* which are being moved by the projecting and retracting motor 22 is relatively small, the torque of the projecting and retracting motor 22 would also be relatively small whereas, when the load applied to the hooks 29*a* becomes relatively large, the torque of the projecting and retracting motor 22 would also become relatively large.

Therefore, the fact that an external force that causes a decrease in the rotational speed of the projecting and retracting motor 22 is applied to the hooks 29*a* can be detected by monitoring the torque of the projecting and retracting motor 22 using a torque sensor (not shown). More specifically, when the torque of the projecting and retracting motor 22 becomes equal to or greater than a preset or predetermined torque, i.e., when the load applied to the hooks 29*a* becomes relatively large, then it can be determined that the external force applied condition (that an external force that causes a decrease in the rotational speed of the projecting and retracting motor 22 is applied to the hooks 29*a* that are being moved by the projecting and retracting motor 22) is satisfied. In other words, whether or not the external force applied condition is satisfied can be determined based on the torque of the projecting and retracting motor 22 without having to directly detect the fact that an external force that causes a decrease in the rotational speed of the projecting and retracting motor 22 is applied to the hooks 29*a* that are being moved by the projecting and retracting motor 22.

<5> In the embodiments described above, the terminating condition for the second control can be changed as appropriate.

For example, the controller C may be configured to determine that the terminating condition for the second control is satisfied when the actual rotational speed of the projecting and retracting motor 22 reaches a preset speed while the second control is performed.

The actual value of the speed to be selected as the preset speed may be changed as appropriate.

<6> In the embodiments described above, an example is described in which the article transport facility has the relay conveyors 3, the lifts 4, and the carry-in-and-out conveyors 5, in addition to the article support portions 1 and the article transport 2. However, the arrangement and structure of the article transport facility may be changed as appropriate. In other words, as long as the article transport facility has at least one article support portion 1 and an article transport 2, the article transport facility may have any other devices.

<7> In the fourth embodiment described above, the case in which an article W being transferred by the hooks 29*a* collides with a step "d" is described as an example of an external force applied condition (that an external force that causes a decrease in the rotational speed of the projecting and retracting motor 22 is applied) being satisfied. The external force applied condition may also be satisfied when the article W transferred by the hooks 29*a* collides with other objects. For example, the external force applied condition may be satisfied when the article W being transferred by the hooks 29*a* comes into contact with components of the article transport facility described above (for example, an article support portion 1, a relay conveyor 3, a load support platform 48, or the component parts of the article transfer device 2B, 2C itself, etc.).

<8> Any arrangement and structure disclosed in any one embodiment (including the alternative embodiments, which is true of any embodiment mentioned below) may be used in combination with any arrangement and structure disclosed in another embodiment, unless such combination leads to a contradiction. In addition, the embodiments disclosed in the present description are described for illustration purposes only and the embodiments of the present disclosure are not limited to these embodiments. And modifications and changes may be made without deviating from the objects of the present disclosure.

[Summary of Embodiments Described Above]

A brief summary of the article transport facility described above is provided next.

The article transfer device is one that is configured to move an article along a transfer direction and comprises:

a contact member configured to be moved along the transfer direction to contact an article and to move the article;

an actuating mechanism which includes an electric motor for moving the contact member along the transfer direction; and an actuation controller configured to control operation of the actuating mechanism;

wherein, when an external force applied condition that an external force that causes a decrease in a rotational speed of the electric motor is applied to the contact member moved by the electric motor is satisfied while the actuation controller is performing a first control for continuously performing a process of providing the electric motor with a command value that depends on an error between an actual rotational speed of the electric motor and a first target rotational speed so as to cause the actual rotational speed to approach the first target rotational speed, then the actuation controller, subsequent to the first control, performs a second control for providing the electric motor with a command value that allows the actual rotational speed to be equal to, and to fall below, the first target rotational speed at a time of the external force applied condition becoming satisfied.

With the arrangement describe above, when the rotational speed of the electric motor is decreased when the external force applied condition is satisfied while performing the first control, the actuation controller performs a second control for providing the electric motor with a command value that allows the actual rotational speed to be equal to, and to fall below, the first target rotational speed at a time of the external force applied condition becoming satisfied. In other words, even if the rotational speed of the electric motor decreases as a result of the fact that the external force applied condition is satisfied, the electric motor would not receive any commands that would cause it to operate at speeds greater than the first target rotational speed at a time of the external force applied condition becoming satisfied, while the second control is performed after performing the first control. As a result, while the second control is performed, any large changes in the actual rotational speed of the electric motor would be suppressed. Therefore, the problem with the conventional system that large changes or fluctuations in the actual rotational speed of the electric motor are repeated and thus collisions and separations between the contact member and the article are repeated can be alleviated.

Therefore, an article transfer device can be provided in which an article can be transferred with the speed of the article kept steady.

Here, the actuation controller preferably performs, as the second control, a control for continuously performing a process of providing the electric motor with a command value that depends on an error between the actual rotational speed and a second target rotational speed so as to cause the actual rotational speed to approach the second target rotational speed, and wherein, for a duration of a time the actuation controller preferably performs the second control, the actuation controller sets and maintains the second target rotational speed at a same speed as the actual rotational speed at the time of the external force applied condition becoming satisfied.

With the arrangement describe above, even if the rotational speed of the electric motor decreases as a result of the fact that the external force applied condition is satisfied, the second target rotational speed is set at the same speed as the actual rotational speed of the electric motor at the time of the external force applied condition becoming satisfied, for the duration of the time the second control (which comes after the first control) is performed. In other words, the second control is started with the second target rotational speed being equal to the actual rotational speed of the electric motor, i.e., with the error being zero. Thus, when the second control is started, the electric motor would not accelerate suddenly, and the contact member and the article are moved at the same speed. In addition, even if the rotational speed of the electric motor decreases as the result of the fact that the external force applied condition is satisfied, the error is zero at the beginning of the second control and then starts to change from that value; thus, the error would not increase rapidly. As a result, while the second control is performed, any large changes in the actual rotational speed of the electric motor would be suppressed.

In addition, the actuation controller preferably performs, as the second control, a control for continuously performing a process of providing the electric motor with a command value that depends on an error between the actual rotational speed and a second target rotational speed so as to cause the actual rotational speed to approach the second target rotational speed, wherein the actuation controller preferably sets and maintains the second target rotational speed at zero for a duration of time the actuating control performs the second control.

With the arrangement describe above, even if the rotational speed of the electric motor decreases as a result of the fact that the external force applied condition is satisfied, the second target rotational speed is set at zero, for the duration of the time the second control (which comes after the first control) is performed. More specifically, since the actual rotational speed of the electric motor is greater than the second target rotational speed (zero), the error becomes less than zero (i.e. error becomes negative); thus, the actual rotational speed is decreased further and approaches zero. As a result, any increase in the actual rotational speed of the electric motor is reduced or prevented while the second control is being performed.

In addition, the actuation controller preferably performs, as the second control, a control for continuously performing a process of providing the electric motor with a command value that depends on an error between the actual rotational speed and a second target rotational speed so as to cause the actual rotational speed to approach the second target rotational speed, wherein, for a duration of a time the actuation controller performs the second control, the actuation controller preferably sets and maintains the second target rotational speed to be a same speed as the first target rotational speed at the time of the external force applied condition becoming satisfied.

With the arrangement describe above, even if the rotational speed of the electric motor decreases as a result of the fact that the external force applied condition is satisfied, the second target rotational speed is set and maintained to be the same speed as the first target rotational speed at the time of the external force applied condition becoming satisfied, for the duration of the time the second control (which comes after the first control) is performed. In other words, even if the rotational speed of the electric motor is decreased, the target rotational speed is not increased and is maintained at the same speed; thus, the error remains relatively small compared with the case in which the target rotational speed is increased. As a result, any large change or fluctuation in the actual rotational speed of the electric motor is reduced or prevented while the second control is performed.

In addition, when a condition for terminating the second control is satisfied while performing the second control, the actuation controller, subsequent to the second control, preferably performs a third control for continuously performing a process of providing the electric motor with a command value that depends on an error between the actual rotational speed and a third target rotational speed so as to cause the actual rotational speed to approach the third target rotational speed.

With the arrangement describe above, the actual rotational speed of the electric motor can be caused to approach the third target rotational speed after performing second control.

For example, the contact member can be moved at relatively low speeds by the first control until the contact member contacts the article. And after the external force applied condition is satisfied (for example, i.e by the contact member colliding with the article) and the second control is performed, the third control can be performed that can move the contact member and the article at relatively at high speeds.

Alternatively, the contact member and the article can be moved at relatively high speeds by the first control while the contact member remains in contact with the article. And after the external force applied condition is satisfied and the second control is performed, the third control can be performed that can move the contact member and the article at relatively at high speeds.

In addition, the actuation controller preferably determines that the condition for terminating the second control is satisfied when a set time period elapses after a beginning of the second control.

With the arrangement describe above, the second control is performed only during the set time period. In other words, any large change or increase in the actual rotational speed of the electric motor would be reduced or prevented by the second control during this set time period.

In addition, the actuation controller preferably determines that the condition for terminating the second control is satisfied when the actual rotational speed of the electric motor reaches a preset speed while the second control is performed.

With the arrangement describe above, the second control is performed until the actual rotational speed of the electric motor reaches a preset speed. In other words, any large change or increase in the actual rotational speed of the electric motor would be reduced or prevented by the second control until the actual rotational speed of the electric motor reaches the preset speed.

In addition, the actuation controller preferably sets the third target rotational speed for a beginning of the third control to be a same speed as the actual rotational speed at a time of the condition for terminating the second control becoming satisfied.

With the arrangement describe above, when starting the third control for continuously performing a process of providing the electric motor with a command value that depends on an error between the actual rotational speed and the third target rotational speed so as to cause the actual rotational speed to approach the third target rotational speed, the third target rotational speed at the beginning is set to be the same speed as the actual rotational speed at the time of the condition for terminating the second control becoming satisfied. In other words, at the moment after the control shifts from the second control to the third control, the error between the third target rotational speed and the actual rotational speed of the electric motor is zero; thus, a sudden acceleration of the electric motor can be prevented.

In addition, the actuation controller preferably determines that the external force applied condition is satisfied when the contact member is moved and reaches a target position which is set based on an expected contact position at which the contact member is expected to come into contact with the article.

When the contact member is moved and reaches the target position which is set based on an expected contact position at which the contact member is expected to come into contact with the article, the contact member comes into contact with the article and a load will be added to the electric motor which is moving the contact member.

Therefore, with the arrangement describe above, it can be determined that the external force applied condition (that an external force that causes a decrease in a rotational speed of the electric motor is applied to the contact member) is satisfied when the contact member is moved and reaches a target position which is set based on an expected contact position at which the contact member is expected to come into contact with the article. In other words, whether or not an external force applied condition is satisfied can be determined based on the position of the contact member, without having to directly detect the fact that an external force that causes a decrease in the rotational speed of the electric motor is applied to the contact member moved by the electric motor.

In addition, the actuation controller preferably determines that the external force applied condition is satisfied if a torque of the electric motor becomes equal to or greater than a preset torque.

When the load applied to the contact member which is being moved by the electric motor is relatively small while the first control is performed, the torque of the electric motor would also be relatively small whereas, when the load applied to the contact member becomes relatively large, the torque of the electric motor would also become relatively large.

Thus, with the arrangement describe above, the fact that the external force applied condition (that an external force that causes a decrease in the rotational speed of the electric motor is applied to the contact member) can be determined to be satisfied when the torque of the electric motor becomes equal to or greater than the preset torque, i.e., when the load on the contact member becomes relatively large. In other words, whether or not the external force applied condition is satisfied can be determined based on the torque of the electric motor, without having to directly detect the fact that an external force that causes a decrease in the rotational speed of the electric motor is applied to the contact member moved by the electric motor.

In addition, the article is preferably a container having an opening that opens upward.

If the article being transferred is subjected to a large acceleration or deceleration, objects held within the article (container) may fall out of place or fall over. In addition, the objects held within the article may get thrown out from the opening of the article.

However, with the arrangement describe above, when the rotational speed of the electric motor is decreased as a result of the fact that the external force applied condition is satisfied, no control would be performed which may cause any large change or increase in the actual rotational speed of the electric motor. As a result, the article can be transferred at a steady moving speed; and, this can reduce the likelihood of the occurrence of objects held within the article falling out of place, falling over or getting thrown out from the opening of the article.

An article transport facility comprises: an article transport which is capable of moving along a travel path and in which the article transfer device described above is mounted; and an article support portion configured to support one or more articles; wherein the article transport is configured to be capable of delivering an article to the article support portion and receiving an article from the article support portion by moving the article along a transfer direction by means of the article transfer device at a preset location along the travel path.

With the arrangement describe above, the article can be transferred at a steady moving speed when moving the article along the transfer direction in order to deliver the article to the article support portion from the article transport, and when moving the article along the transfer direction in order for the article transport to receive the article from the article support portion.

Here, it is preferable that the travel path generally extends linearly, and that the article support portion generally extends linearly along the travel path. And a direction along which the travel path for the article transport extends is preferably perpendicular to the transfer direction in plan view.

With the arrangement describe above, the article transport can move an article along the travel path which generally extends linearly and can transfer an article to or from the article support portion which extends along the travel path.

The article transfer device and the article transport facility in accordance with the present disclosure only need to perform at least one of the results or effects described above.

What is claimed is:
1. An article transfer device configured to move an article along a transfer direction comprising:

a contact member configured to be moved along the transfer direction to contact an article and to move the article;

an actuating mechanism which includes an electric motor for moving the contact member along the transfer direction; and an actuation controller configured to control operation of the actuating mechanism;

wherein, when an external force applied condition that an external force causing a decrease in a rotational speed of the electric motor is applied to the contact member moved by the electric motor, the contact member being moved while the actuation controller is performing a first control for continuously performing a process of providing the electric motor with a command value, said command value depending on an error between an actual rotational speed of the electric motor and a first target rotational speed so as to cause the actual rotational speed to approach the first target rotational speed, then the actuation controller, subsequent to the first control, performs a second control for providing the electric motor with a command value that allows the actual rotational speed to be equal to, and to fall below, the first target rotational speed at a time when the external force applied condition is satisfied.

2. The article transfer device as defined in claim 1, wherein the actuation controller performs, as the second control, a control for continuously performing a process of providing the electric motor with a command value that depends on an error between the actual rotational speed and a second target rotational speed so as to cause the actual rotational speed to approach the second target rotational speed, and wherein, for a duration of a time the actuation controller performs the second control, the actuation controller sets and maintains the second target rotational speed at a same speed as the actual rotational speed at the time when the external force applied condition is satisfied.

3. The article transfer device as defined in claim 1, wherein the actuation controller performs, as the second control, a control for continuously performing a process of providing the electric motor with a command value that depends on an error between the actual rotational speed and a second target rotational speed so as to cause the actual rotational speed to approach the second target rotational speed, and wherein the actuation controller sets and maintains the second target rotational speed at zero for a duration of time the actuating control performs the second control.

4. The article transfer device as defined in claim 1, wherein the actuation controller performs, as the second control, a control for continuously performing a process of providing the electric motor with a command value that depends on an error between the actual rotational speed and a second target rotational speed so as to cause the actual rotational speed to approach the second target rotational speed, and wherein, for a duration of a time the actuation controller performs the second control, the actuation controller sets and maintains the second target rotational speed to be a same speed as the first target rotational speed at the time when the external force applied condition is satisfied.

5. The article transfer device as defined in claim 1, wherein when a condition for terminating the second control is satisfied while performing the second control, the actuation controller, subsequent to the second control, performs a third control for continuously performing a process of providing the electric motor with a command value that depends on an error between the actual rotational speed and a third target rotational speed so as to cause the actual rotational speed to approach the third target rotational speed.

6. The article transfer device as defined in claim 5, wherein the actuation controller determines that the condition for terminating the second control is satisfied when a set time period elapses after a beginning of the second control.

7. The article transfer device as defined in claim 5, wherein the actuation controller determines that the condition for terminating the second control is satisfied when the actual rotational speed of the electric motor reaches a preset speed while the second control is performed.

8. The article transfer device as defined in claim 5, wherein the actuation controller sets the third target rotational speed for a beginning of the third control to be a same speed as the actual rotational speed at a time when the condition for terminating the second control is satisfied.

9. The article transfer device as defined in claim 1, wherein the actuation controller determines that the external force applied condition is satisfied when the contact member is moved and reaches a target position, said target position being set based on an expected contact position at which the contact member is expected to come into contact with the article.

10. The article transfer device as defined in claim 1, wherein the actuation controller determines that the external force applied condition is satisfied if a torque of the electric motor becomes equal to or greater than a preset torque.

11. The article transfer device as defined in claim 1, wherein the article is a container having an opening that opens upward.

12. An article transport facility comprising:
an article transport capable of moving along a travel path and wherein the article transfer device as defined in claim 1 is mounted; and
an article support portion configured to support one or more articles;
wherein the article transport is configured to be capable of delivering an article to the article support portion and receiving an article from the article support portion by moving the article along a transfer direction by means of the article transfer device at a preset location along the travel path.

13. The article transport facility as defined in claim 12, wherein the travel path generally extends linearly,
wherein the article support portion generally extends linearly along the travel path, and
wherein a direction along which the travel path for the article transport extends is perpendicular to the transfer direction in plan view.

14. The article transport facility as defined in claim 12, wherein the travel path generally extends curvilinearly,
wherein the article support portion generally extends curvilinearly along the travel path, and
wherein a direction along which the travel path for the article transport extends is perpendicular to the transfer direction in plan view.

15. The article transport facility as defined in claim 12, wherein the travel path generally forms a loop,
wherein the article support portion generally forms a loop extending along the travel path, and
wherein a direction along which the travel path for the article transport extends is perpendicular to the transfer direction in plan view.

* * * * *